United States Patent
Ohta

(10) Patent No.: US 7,596,466 B2
(45) Date of Patent: Sep. 29, 2009

(54) INCLINATION CALCULATION APPARATUS AND INCLINATION CALCULATION PROGRAM, AND GAME APPARATUS AND GAME PROGRAM

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 11/408,071

(22) Filed: Apr. 21, 2006

(65) Prior Publication Data
US 2007/0233424 A1    Oct. 4, 2007

(30) Foreign Application Priority Data
Mar. 28, 2006  (JP) .............................. 2006-087160

(51) Int. Cl.
*G01C 9/00*  (2006.01)
(52) U.S. Cl. ...................................... 702/152; 702/154
(58) Field of Classification Search .................. 702/152, 702/154
See application file for complete search history.

(56) References Cited

U.S. PATENT DOCUMENTS

| | | | |
|---|---|---|---|
| D220,268 S | 3/1971 | Kliewer |
| 4,285,523 A | 8/1981 | Lemelson |
| 4,402,250 A | 9/1983 | Baasch |
| 4,526,431 A | 7/1985 | Kasukawa |
| 4,739,128 A | 4/1988 | Grisham |
| 4,816,810 A | 3/1989 | Moore |
| 4,839,838 A | 6/1989 | Labiche et al. |
| 4,862,165 A | 8/1989 | Gart |
| 4,961,369 A | 10/1990 | McGill |
| 4,969,647 A | 11/1990 | Mical et al. |
| 4,994,795 A | 2/1991 | MacKenzie |
| 5,009,501 A | 4/1991 | Fenner et al. |
| D320,624 S | 10/1991 | Taylor |
| 5,059,958 A | 10/1991 | Jacobs et al. |
| D322,242 S | 12/1991 | Cordell |
| 5,080,604 A | 1/1992 | Rider et al. |
| D325,225 S | 4/1992 | Adhida |
| 5,119,079 A | 6/1992 | Hube et al. |

(Continued)

FOREIGN PATENT DOCUMENTS

DE    3930581 A1    3/1991

(Continued)

OTHER PUBLICATIONS

Translation of WO2004/051931 to Dominique David, PTO 08-0542.*

(Continued)

*Primary Examiner*—Drew A Dunn
*Assistant Examiner*—Stephen J Cherry
(74) *Attorney, Agent, or Firm*—Nixon & Vanderhye P.C.

(57) ABSTRACT

An inclination calculation apparatus sequentially calculates an inclination of an input device operable in terms of a posture thereof. The input device includes acceleration detection means and imaging means. The inclination calculation apparatus sequentially calculates first inclination information representing an inclination of the input device from positions of two imaging targets in a taken image obtained by the imaging means. The inclination calculation apparatus also sequentially calculates second inclination information representing an inclination of the input device from an acceleration detected by the acceleration detection means. The inclination calculation apparatus calculates an inclination of the input device using the first inclination information and the second inclination information.

20 Claims, 18 Drawing Sheets

U.S. PATENT DOCUMENTS

| | | |
|---|---|---|
| 5,128,671 A | 7/1992 | Thomas, Jr. |
| D328,463 S | 8/1992 | King et al. |
| D331,058 S | 11/1992 | Morales |
| 5,178,477 A | 1/1993 | Gambaro |
| 5,181,181 A | 1/1993 | Glynn |
| 5,192,082 A | 3/1993 | Inoue et al. |
| 5,207,426 A | 5/1993 | Inoue et al. |
| D338,242 S | 8/1993 | Cordell |
| 5,259,626 A | 11/1993 | Ho |
| D345,164 S | 3/1994 | Grae |
| 5,296,871 A | 3/1994 | Paley |
| 5,332,322 A | 7/1994 | Gambaro |
| D350,782 S | 9/1994 | Barr |
| D351,430 S | 10/1994 | Barr |
| 5,369,889 A | 12/1994 | Callaghan et al. |
| D360,903 S | 8/1995 | Barr et al. |
| 5,440,326 A | 8/1995 | Quinn |
| D362,870 S | 10/1995 | Oikawa |
| 5,459,489 A | 10/1995 | Redford |
| 5,481,957 A | 1/1996 | Paley et al. |
| 5,506,605 A | 4/1996 | Paley |
| 5,512,892 A | 4/1996 | Corballis et al. |
| 5,515,077 A | 5/1996 | Tateyama |
| 5,515,104 A | 5/1996 | Okada |
| 5,523,800 A | 6/1996 | Dudek |
| 5,528,265 A | 6/1996 | Harrison |
| 5,528,388 A | 6/1996 | Tanaka |
| 5,551,701 A | 9/1996 | Bouton et al. |
| 5,561,543 A | 10/1996 | Ogawa |
| 5,563,628 A | 10/1996 | Stroop |
| D375,326 S | 11/1996 | Yokoi et al. |
| 5,574,479 A | 11/1996 | Odell |
| D376,826 S | 12/1996 | Ashida |
| 5,586,237 A | 12/1996 | Baecker |
| 5,587,558 A | 12/1996 | Matsushima |
| 5,598,187 A | 1/1997 | Ide et al. |
| 5,627,565 A | 5/1997 | Morishita et al. |
| D379,832 S | 6/1997 | Ashida |
| 5,642,279 A | 6/1997 | Bloomberg et al. |
| 5,643,087 A | 7/1997 | Marcus et al. |
| 5,645,277 A | 7/1997 | Cheng |
| 5,667,220 A | 9/1997 | Cheng |
| 5,670,988 A | 9/1997 | Tickle |
| 5,677,708 A | 10/1997 | Matthews, III et al. |
| 5,702,323 A | 12/1997 | Poulton |
| 5,703,623 A | 12/1997 | Hall et al. |
| 5,724,106 A | 3/1998 | Autry et al. |
| 5,734,807 A | 3/1998 | Sumi |
| D393,884 S | 4/1998 | Hayami |
| 5,757,360 A | 5/1998 | Nitta et al. |
| D395,464 S | 6/1998 | Shiibashi et al. |
| 5,769,719 A | 6/1998 | Hsu |
| 5,774,357 A | 6/1998 | Hoffberg et al. |
| 5,785,317 A | 7/1998 | Sasaki |
| D397,162 S | 8/1998 | Yokoi et al. |
| 5,793,438 A | 8/1998 | Bedard |
| 5,807,174 A | 9/1998 | Fukuhara et al. |
| 5,812,119 A | 9/1998 | Tateyama |
| 5,820,462 A | 10/1998 | Yokoi et al. |
| 5,822,713 A | 10/1998 | Profeta |
| D402,328 S | 12/1998 | Ashida |
| 5,850,624 A | 12/1998 | Gard et al. |
| D405,071 S | 2/1999 | Gambaro |
| 5,879,194 A | 3/1999 | Thenaisie et al. |
| D407,761 S | 4/1999 | Barr |
| 5,898,421 A | 4/1999 | Quinn |
| 5,898,435 A | 4/1999 | Nagahara et al. |
| 5,900,867 A | 5/1999 | Schindler et al. |
| 5,902,968 A | 5/1999 | Sato et al. |
| 5,913,727 A | 6/1999 | Ahdoot |
| 5,920,477 A | 7/1999 | Hoffberg et al. |
| D412,940 S | 8/1999 | Kato et al. |
| 5,956,035 A | 9/1999 | Sciammarella et al. |
| 5,967,898 A | 10/1999 | Takasaka et al. |
| 5,971,790 A | 10/1999 | Rohde |
| 5,981,883 A | 11/1999 | Shriver |
| 5,981,884 A | 11/1999 | Sato et al. |
| 5,989,157 A | 11/1999 | Walton |
| 5,990,890 A | 11/1999 | Etheredge |
| D419,199 S | 1/2000 | Cordell et al. |
| D419,200 S | 1/2000 | Ashida |
| 6,018,372 A | 1/2000 | Etheredge |
| 6,019,680 A | 2/2000 | Cheng |
| 6,045,446 A | 4/2000 | Ohshima |
| 6,057,788 A | 5/2000 | Cummings |
| 6,066,075 A | 5/2000 | Poulton |
| 6,072,467 A | 6/2000 | Walker |
| 6,084,556 A | 7/2000 | Zwern |
| 6,084,577 A | 7/2000 | Sato et al. |
| 6,099,339 A | 8/2000 | Yanagida et al. |
| 6,104,842 A | 8/2000 | Rich |
| 6,110,039 A | 8/2000 | Oh |
| 6,111,614 A | 8/2000 | Mugura et al. |
| 6,133,962 A | 10/2000 | Proehl et al. |
| D433,381 S | 11/2000 | Talesfore |
| 6,146,278 A | 11/2000 | Kobayashi |
| 6,151,059 A | 11/2000 | Schein et al. |
| 6,172,674 B1 | 1/2001 | Etheredge |
| 6,177,931 B1 | 1/2001 | Alexander et al. |
| 6,181,329 B1 | 1/2001 | Stork et al. |
| 6,184,847 B1 | 2/2001 | Fateh et al. |
| 6,195,122 B1 | 2/2001 | Vincent |
| 6,198,471 B1 | 3/2001 | Cook |
| 6,208,333 B1 | 3/2001 | Tateyama |
| 6,211,856 B1 | 4/2001 | Choi et al. |
| 6,222,525 B1 | 4/2001 | Armstrong |
| D442,998 S | 5/2001 | Ashida |
| 6,229,102 B1 | 5/2001 | Sato et al. |
| 6,238,291 B1 | 5/2001 | Fujimoto et al. |
| 6,243,658 B1 | 6/2001 | Raby |
| 6,244,956 B1 | 6/2001 | Nakayama et al. |
| 6,251,011 B1 | 6/2001 | Yamazaki |
| 6,252,997 B1 | 6/2001 | Miura et al. |
| 6,280,327 B1 | 8/2001 | Leifer et al. |
| 6,292,215 B1 | 9/2001 | Vincent |
| 6,312,335 B1 | 11/2001 | Tosaki et al. |
| 6,315,673 B1 | 11/2001 | Kopera et al. |
| 6,344,791 B1 | 2/2002 | Armstrong |
| 6,347,998 B1 | 2/2002 | Yoshitomi et al. |
| 6,351,205 B1 | 2/2002 | Armstrong |
| 6,359,603 B1 | 3/2002 | Zwern |
| D456,410 S | 4/2002 | Ashida |
| 6,369,794 B1 | 4/2002 | Sakurai et al. |
| 6,375,572 B1 | 4/2002 | Masuyama et al. |
| 6,377,906 B1 | 4/2002 | Rowe |
| 6,380,944 B2 | 4/2002 | Tateyama |
| D456,854 S | 5/2002 | Ashida |
| 6,384,869 B1 | 5/2002 | Sciammarella et al. |
| 6,392,613 B1 | 5/2002 | Goto |
| 6,394,904 B1 | 5/2002 | Stalker |
| D458,972 S | 6/2002 | Ashida |
| 6,405,371 B1 | 6/2002 | Oosterhout et al. |
| 6,411,275 B1 | 6/2002 | Hedberg |
| D459,727 S | 7/2002 | Ashida |
| D460,787 S | 7/2002 | Hishikawa |
| 6,421,067 B1 | 7/2002 | Kamen et al. |
| 6,439,931 B1 | 8/2002 | Niitsu et al. |
| D462,683 S | 9/2002 | Ashida |
| 6,445,364 B2 | 9/2002 | Zwern |
| 6,518,952 B1 | 2/2003 | Leiper |
| D473,942 S | 4/2003 | Motoki et al. |
| 6,540,611 B1 | 4/2003 | Nagata |
| 6,544,124 B2 | 4/2003 | Ireland et al. |
| 6,545,661 B1 | 4/2003 | Goschy et al. |

| | | |
|---|---|---|
| 6,563,415 B2 | 5/2003 | Armstrong |
| 6,565,444 B2 | 5/2003 | Nagata et al. |
| 6,577,350 B1 | 6/2003 | Proehl et al. |
| 6,590,536 B1 | 7/2003 | Walton |
| 6,597,443 B2 | 7/2003 | Boman |
| 6,636,826 B1 | 10/2003 | Abe et al. |
| 6,672,962 B1 | 1/2004 | Ozaki et al. |
| 6,679,776 B1 * | 1/2004 | Nishiumi et al. .............. 463/36 |
| 6,687,411 B1 | 2/2004 | Miura et al. |
| 6,727,885 B1 | 4/2004 | Ishino et al. |
| 6,743,104 B1 | 6/2004 | Ota et al. |
| 6,747,632 B2 | 6/2004 | Howard |
| 6,752,719 B2 | 6/2004 | Himoto et al. |
| 6,754,906 B1 | 6/2004 | Finseth et al. |
| D495,336 S | 8/2004 | Andre et al. |
| 6,799,986 B2 | 10/2004 | Igarashi et al. |
| 6,811,491 B1 | 11/2004 | Levenberg et al. |
| 6,816,151 B2 | 11/2004 | Dellinger |
| 6,821,204 B2 | 11/2004 | Aonuma et al. |
| 6,836,971 B1 | 1/2005 | Wan |
| 6,850,221 B1 | 2/2005 | Tickle |
| 6,857,128 B1 | 2/2005 | Borden, IV et al. |
| D502,468 S | 3/2005 | Knight et al. |
| 6,873,406 B1 | 3/2005 | Hines et al. |
| D503,750 S | 4/2005 | Kit et al. |
| D505,424 S | 5/2005 | Ashida et al. |
| 6,890,262 B2 | 5/2005 | Oishi et al. |
| 6,896,523 B2 | 5/2005 | Nishizawa et al. |
| 6,906,700 B1 | 6/2005 | Armstrong |
| 6,908,386 B2 | 6/2005 | Suzuki et al. |
| 6,908,388 B2 | 6/2005 | Shimizu et al. |
| 6,926,610 B2 | 8/2005 | Kobayashi et al. |
| 6,933,861 B2 | 8/2005 | Wang |
| 6,955,606 B2 | 10/2005 | Taho et al. |
| 6,957,976 B2 | 10/2005 | Zhang |
| 6,978,472 B1 | 12/2005 | Nashida et al. |
| 6,982,697 B2 | 1/2006 | Wilson et al. |
| 6,990,639 B2 | 1/2006 | Wilson |
| 7,014,490 B1 | 3/2006 | Morikawa et al. |
| 7,030,856 B2 | 4/2006 | Dawson et al. |
| 7,031,875 B2 | 4/2006 | Ellenby et al. |
| 7,081,051 B2 | 7/2006 | Himoto et al. |
| D527,006 S | 8/2006 | Francz et al. |
| 7,090,582 B2 | 8/2006 | Danieli et al. |
| 7,094,147 B2 | 8/2006 | Nakata et al. |
| 7,098,894 B2 | 8/2006 | Yang et al. |
| D528,510 S | 9/2006 | Schmieta et al. |
| 7,102,616 B1 | 9/2006 | Sleator |
| 7,104,842 B1 | 9/2006 | Huang et al. |
| D531,228 S | 10/2006 | Ashida et al. |
| D531,585 S | 11/2006 | Weitgasser et al. |
| 7,139,983 B2 | 11/2006 | Kelts |
| 7,149,627 B2 | 12/2006 | Ockerse et al. |
| 7,154,475 B2 | 12/2006 | Crew |
| 7,155,604 B2 | 12/2006 | Kawai |
| 7,158,118 B2 | 1/2007 | Liberty |
| D543,246 S | 5/2007 | Ashida et al. |
| 7,218,313 B2 | 5/2007 | Marcus et al. |
| 7,233,316 B2 | 6/2007 | Smith et al. |
| 7,236,156 B2 | 6/2007 | Liberty et al. |
| D547,304 S | 7/2007 | Francz et al. |
| 7,239,301 B2 | 7/2007 | Liberty et al. |
| 7,260,789 B2 | 8/2007 | Hunleth et al. |
| 7,262,760 B2 | 8/2007 | Liberty |
| D550,214 S | 9/2007 | Francz et al. |
| D550,633 S | 9/2007 | Gupta |
| D551,660 S | 9/2007 | Francz et al. |
| 7,266,833 B2 | 9/2007 | Ward, III et al. |
| D552,567 S | 10/2007 | Francz |
| 7,292,151 B2 | 11/2007 | Ferguson et al. |
| 7,298,851 B1 | 11/2007 | Hendricks et al. |
| 7,360,762 B2 | 4/2008 | Itagaki et al. |
| 7,373,652 B1 | 5/2008 | Bayrakeri et al. |
| 7,386,806 B2 | 6/2008 | Wroblewski |
| 7,414,611 B2 | 8/2008 | Liberty |
| 2001/0024973 A1 | 9/2001 | Meredith |
| 2001/0030667 A1 | 10/2001 | Kelts |
| 2001/0031662 A1 | 10/2001 | Larian |
| 2001/0050672 A1 | 12/2001 | Kobayashi |
| 2002/0003416 A1 | 1/2002 | Sagasaki et al. |
| 2002/0012014 A1 | 1/2002 | Mohri |
| 2002/0024500 A1 | 2/2002 | Howard |
| 2002/0054134 A1 | 5/2002 | Kelts |
| 2002/0059603 A1 | 5/2002 | Kelts |
| 2002/0072418 A1 | 6/2002 | Masuyama et al. |
| 2002/0073424 A1 | 6/2002 | Ward, III et al. |
| 2002/0098887 A1 | 7/2002 | Himoto et al. |
| 2002/0103026 A1 | 8/2002 | Himoto et al. |
| 2002/0107069 A1 | 8/2002 | Ishino |
| 2002/0112237 A1 | 8/2002 | Kelts |
| 2002/0129366 A1 | 9/2002 | Schein et al. |
| 2002/0140666 A1 | 10/2002 | Bradski |
| 2002/0140745 A1 | 10/2002 | Ellenby et al. |
| 2003/0011573 A1 | 1/2003 | Villet et al. |
| 2003/0038778 A1 | 2/2003 | Noguera |
| 2003/0073492 A1 * | 4/2003 | Tosaki et al. ................... 463/37 |
| 2003/0078086 A1 | 4/2003 | Matsuyama et al. |
| 2003/0216176 A1 | 11/2003 | Shimizu et al. |
| 2004/0022969 A1 | 2/2004 | Liu et al. |
| 2004/0070564 A1 | 4/2004 | Dawson et al. |
| 2004/0134341 A1 | 7/2004 | Sandoz et al. |
| 2004/0143413 A1 | 7/2004 | Oystol et al. |
| 2004/0148174 A1 | 7/2004 | Ullman et al. |
| 2004/0152515 A1 | 8/2004 | Wegmuller et al. |
| 2004/0218104 A1 | 11/2004 | Smith et al. |
| 2004/0227725 A1 | 11/2004 | Calarco et al. |
| 2004/0252119 A1 | 12/2004 | Hunleth et al. |
| 2004/0252120 A1 | 12/2004 | Hunleth et al. |
| 2004/0268393 A1 | 12/2004 | Hunleth et al. |
| 2005/0005241 A1 | 1/2005 | Hunleth et al. |
| 2005/0017454 A1 | 1/2005 | Endo et al. |
| 2005/0044509 A1 | 2/2005 | Hunleth et al. |
| 2005/0071063 A1 | 3/2005 | Yamashita |
| 2005/0076161 A1 | 4/2005 | Albanna et al. |
| 2005/0125826 A1 | 6/2005 | Hunleth et al. |
| 2005/0143173 A1 | 6/2005 | Barney et al. |
| 2005/0151448 A1 | 7/2005 | Hikida et al. |
| 2005/0156675 A1 | 7/2005 | Rohde et al. |
| 2005/0174324 A1 | 8/2005 | Liberty et al. |
| 2005/0182792 A1 | 8/2005 | Israel et al. |
| 2005/0188333 A1 | 8/2005 | Hunleth et al. |
| 2005/0195159 A1 | 9/2005 | Hunleth et al. |
| 2005/0204391 A1 | 9/2005 | Hunleth et al. |
| 2005/0212752 A1 | 9/2005 | Marvit et al. |
| 2005/0215322 A1 | 9/2005 | Himoto et al. |
| 2005/0233808 A1 | 10/2005 | Himoto et al. |
| 2005/0243061 A1 | 11/2005 | Liberty et al. |
| 2005/0243062 A1 | 11/2005 | Liberty |
| 2005/0253806 A1 | 11/2005 | Liberty et al. |
| 2005/0278364 A1 | 12/2005 | Kamen |
| 2005/0283798 A1 | 12/2005 | Hunleth et al. |
| 2005/0283988 A1 | 12/2005 | Sato et al. |
| 2006/0019545 A1 | 1/2006 | Moriyama et al. |
| 2006/0020905 A1 | 1/2006 | Wroblewski |
| 2006/0028446 A1 | 2/2006 | Liberty et al. |
| 2006/0109242 A1 | 5/2006 | Simpkins |
| 2006/0110971 A1 | 5/2006 | Wu |
| 2006/0110972 A1 | 5/2006 | Wu |
| 2006/0130013 A1 | 6/2006 | Penzias et al. |
| 2006/0139619 A1 | 6/2006 | Fujii et al. |
| 2006/0150215 A1 | 7/2006 | Wroblewski |
| 2006/0172609 A1 | 8/2006 | Wang et al. |
| 2006/0176403 A1 | 8/2006 | Gritton et al. |
| 2006/0178212 A1 | 8/2006 | Penzias |
| 2006/0184966 A1 | 8/2006 | Hunleth et al. |
| 2006/0218587 A1 | 9/2006 | Kelts |

| | | | |
|---|---|---|---|
| 2006/0218588 A1 | 9/2006 | Kelts | |
| 2006/0246765 A1 | 11/2006 | Wu | |
| 2006/0250358 A1 | 11/2006 | Wroblewski | |
| 2006/0258452 A1 | 11/2006 | Hsu | |
| 2006/0262116 A1 | 11/2006 | Moshiri et al. | |
| 2007/0002037 A1 | 1/2007 | Kuroki et al. | |
| 2007/0021208 A1 | 1/2007 | Mao et al. | |
| 2007/0028190 A1 | 2/2007 | Stachfield | |
| 2007/0035518 A1 | 2/2007 | Francz et al. | |
| 2007/0049374 A1 | 3/2007 | Ikeda et al. | |
| 2007/0052177 A1 | 3/2007 | Ikeda et al. | |
| 2007/0060228 A1 | 3/2007 | Akasaka et al. | |
| 2007/0067798 A1 | 3/2007 | Wroblewski | |
| 2007/0072680 A1 | 3/2007 | Ikeda et al. | |
| 2007/0073492 A1 | 3/2007 | Manneschi | |
| 2007/0091068 A1 | 4/2007 | Liberty | |
| 2007/0113207 A1 | 5/2007 | Gritton | |
| 2007/0124097 A1 | 5/2007 | Geck et al. | |
| 2007/0176896 A1 | 8/2007 | Gritton et al. | |
| 2007/0192739 A1 | 8/2007 | Hunleth et al. | |
| 2007/0192794 A1 | 8/2007 | Curtis et al. | |
| 2007/0199022 A1 | 8/2007 | Moshiri et al. | |
| 2007/0233424 A1 | 10/2007 | Ohta | |
| 2007/0247425 A1 | 10/2007 | Liberty et al. | |
| 2007/0252813 A1 | 11/2007 | Liberty et al. | |
| 2007/0257885 A1 | 11/2007 | Liberty | |
| 2007/0265075 A1 | 11/2007 | Zalewski | |
| 2007/0288870 A1 | 12/2007 | Hunleth et al. | |
| 2007/0298882 A1 | 12/2007 | Marks et al. | |
| 2008/0060009 A1 | 3/2008 | Kelts | |
| 2008/0060010 A1 | 3/2008 | Kelts | |
| 2008/0060011 A1 | 3/2008 | Kelts | |
| 2008/0060020 A1 | 3/2008 | Kelts | |
| 2008/0063381 A1 | 3/2008 | Conroy et al. | |
| 2008/0065989 A1 | 3/2008 | Conroy et al. | |
| 2008/0082927 A1 | 4/2008 | Kelts | |
| 2008/0158154 A1 | 7/2008 | Liberty et al. | |
| 2008/0158155 A1 | 7/2008 | Liberty et al. | |
| 2008/0222675 A1 | 9/2008 | Moshiri et al. | |
| 2008/0291163 A1 | 11/2008 | Liberty | |

FOREIGN PATENT DOCUMENTS

| | | |
|---|---|---|
| DE | 19525644 A1 | 7/1995 |
| DE | 19648487 C1 | 11/1996 |
| DE | 19701344 A1 | 7/1997 |
| DE | 19701374 A1 | 7/1997 |
| DE | 19814254 A1 | 10/1998 |
| DE | 19937307 A1 | 2/2000 |
| DE | 10146571 A1 | 9/2001 |
| DE | 10029173 A1 | 1/2002 |
| DE | 10241392 A1 | 5/2003 |
| DE | 10219198 A1 | 11/2003 |
| EP | 0 626 635 A2 | 11/1994 |
| EP | 0 728 503 | 8/1996 |
| EP | 1 835 676 A1 | 4/1998 |
| EP | 0 852 961 A1 | 7/1998 |
| EP | 1 062 994 A2 | 12/2000 |
| EP | 1 062 994 A3 | 12/2000 |
| EP | 1 222 949 A2 | 7/2002 |
| EP | 1 239 260 | 9/2002 |
| EP | 1 279 425 | 1/2003 |
| EP | 1 287 864 A2 | 3/2003 |
| EP | 1 293 237 | 3/2003 |
| EP | 1 222 949 A3 | 9/2004 |
| GB | 2 244 546 | 5/1990 |
| JP | 62-143124 | 6/1987 |
| JP | 02-198299 | 8/1990 |
| JP | 2312173 | 12/1990 |
| JP | 4-237319 | 8/1992 |
| JP | 3-000028 | 4/1994 |
| JP | 06-190144 | 7/1994 |
| JP | 06-308879 | 11/1994 |
| JP | 07-28591 | 1/1995 |
| JP | 07-107573 | 4/1995 |
| JP | 7107573 | 4/1995 |
| JP | 07-22312 | 5/1995 |
| JP | 07-115690 | 5/1995 |
| JP | 115690 | 5/1995 |
| JP | 08-071252 | 3/1996 |
| JP | 8-510869 | 11/1996 |
| JP | 08-335136 | 12/1996 |
| JP | 09-230997 | 9/1997 |
| JP | 10021000 | 1/1998 |
| JP | 11-85453 | 3/1999 |
| JP | 11099284 | 4/1999 |
| JP | 11-196297 | 7/1999 |
| JP | 11-305935 | 11/1999 |
| JP | 2000-500639 | 1/2000 |
| JP | 2000-270237 | 9/2000 |
| JP | 2000-308756 | 11/2000 |
| JP | 2001-159951 | 6/2001 |
| JP | 2001-241975 | 9/2001 |
| JP | 3262677 | 12/2001 |
| JP | 2002-062981 | 2/2002 |
| JP | 2002-081909 | 3/2002 |
| JP | 2002-91692 | 3/2002 |
| JP | 2002-153673 | 5/2002 |
| JP | 2002-233665 | 8/2002 |
| JP | 3-422383 | 4/2003 |
| JP | 3517482 | 1/2004 |
| JP | 2004-62774 | 2/2004 |
| JP | 2005-106664 | 4/2005 |
| JP | 3661893 B2 | 6/2005 |
| JP | 3677037 B2 | 7/2005 |
| JP | 2005-239984 | 8/2005 |
| JP | 2006-047295 | 2/2006 |
| JP | 2006136694 | 6/2006 |
| RU | 2125853 C1 | 4/1988 |
| RU | 2119187 C1 | 5/1991 |
| RU | 2110162 C1 | 11/1993 |
| RU | 2126161 C1 | 6/1994 |
| RU | 2141738 C1 | 10/1995 |
| WO | 94/14282 | 6/1994 |
| WO | WO 97/29589 | 8/1997 |
| WO | WO 99/57521 | 11/1999 |
| WO | WO 00/11540 | 3/2000 |
| WO | WO 00/63874 | 10/2000 |
| WO | 01/86920 | 11/2001 |
| WO | 2004/012130 | 2/2004 |
| WO | WO 2004/012130 A1 | 2/2004 |
| WO | 2004/036244 | 4/2004 |
| WO | 2004/051391 | 6/2004 |
| WO | 2007-051391 A2 | 6/2004 |
| WO | WO 2004/051391 A2 | 6/2004 |
| WO | 2004/066615 A1 | 8/2004 |
| WO | WO 2004/066615 A1 | 8/2004 |

OTHER PUBLICATIONS

U.S. Appl. No. 11/764,409, filed Jun. 18, 2007; Inventor Keizo Ohta.
Nister, David: "A Minimal Solution to the Generalised 3-Point Problems"; Proc. of Conf. on Computer Vision and Pattern Recognition (CVPR), Jun. 27, 2004; pp. 560-567; XP-002455848.
EP Search Report dated Nov. 8, 2007 in EP 06008201.3.
"Empowering People," Human Factors in Computer Systems—Special Issue of the SIGCHI Bulleting, CHI '90 Conference Proceedings, Seattle, Washington, Apr. 1-5, 199.
"Hyper Mochi Sheet: A Predictive Focusing Interface for Navigating and Editing Nested Networks through a Multi-focus Distortion-Oriented View," by Masashi Toyoda and Etsuya Shibayama of Department of Mathematical and Computing Sciences, Tokyo Institute of Technology, *CHI* 99, May 15-20, 1999.

"Local Tools: An Alternative to Tool Palettes," by Benjamin B. Bederson, James D. Hollan, Allison Druin, Jason Stewart, David Rogers, David Proft, UIST '96 Seattle, Washington USA, 1996 ACM 0-89791-798-7/96/11.

"Multiple-View Approach for Smooth Information Retrieval," by Toshiyuki Masui, Mitsuru Minakuchi, George R. Borden IV, Kouichi Kashiwagi of Software Research Laboratories, *UIST '95*, Nov. 14-17, 1995.

"A Multiple, Virtual-Workspace Interface to Support User Task Switching," by Stuart K. Card and Austin Henderson, Jr. of Intelligent Systems Laboratory, Xerox Palo Alto Research Center, 1987, *CHI + GI* 1987.

"Rooms: The Use of Multiple Virtual Workspaces to Reduce Space Contention in a Window-Based Graphical User Interface," by D. Austin Henderson, Jr., and Stuart K. Card of Xerox Palo Alto Research Center, *ACM Transactions on Graphics*, vol. 5, No. 3, Jul. 1986, pp. 211-243.

"Iconic Interfacing," *IEEE Xplore*, Mar./Apr. 1983 by Kenneth N. Lodding of Digital Equipment Corporation.

"Rapid Controlled Movement Through a Virtual 3D Workspace," *Computer Graphics*, vol. 24, No. 4, Aug. 1990 by Jock D. Mackinlay, Stuart K. Card and George G. Robertson of Xerox Palo Alto Research Center.

"Lecture Notes in Computer Science," Image Data Structures by Steven L. Tanimoto, Copyright 1980.

"Structured Computer Vision—Machine Perception through Hierarchial Computation Structures," by S. Tanimoto and A. Klinger, Academic Press 1980.

"PadPrints: Graphical Multiscale Web Histories," by Ron R. Hightower, Laura T. Ring, Jonathan I. Helfman, Benjamin B. Bederson, James D. Hollan of Computer Science Department, University of New Mexico, www.cs.umd.edu.hcil/pad++ 1998.

"The Management Of Very Large Two-Dimensional Raster Graphics Environments," by Mark Friedell, Richard Carling, David Kramlich and Christopher F. Herot of Computer Science Research Division, Computer Corporation of America 1980 IEEE.

"Picture Data Description and Management," Aug. 27-28, 1980, Sponsored by the Technical Committee on Machine Intelligence and Pattern Analysis of the IEEE Computer Society by Christopher F. Herot, Richard Carling, Mark Friedell, David Kremlich "A Prototype Spatial Data Management System".

"A Minimal Solution to the Generalised 3-Point Problem"; Proc. Of Conf. on Computer Vision and Pattern Recognition (CVPR); by David Nister, Jun. 27, 2004; pp. 560-567; XP-002455848.

Mouser Catalog Download, MOLEX USB Connectors and Cable, Assemblies, p. 979 (2007).

Mouser "D" Connectors, Spectrum Control Inc., ESD/EMI Filtered USB Connectors & Patch Antenna Elements (2007).

Mouser Catalog Download, Telecom, DVI, HDMI, and Interface Connectors, p. 992 (2007).

Mouser Catalog Download, MOLEX Cable Assemblies, p. 881 (2007).

Mouser Electronics, New Products at Mouser Electronics, New Interconnects, 8 pages (copyright 1996-2007).

"Inventing the User Lisa Interface," *Interactions*, Feb. 1997 by Roderick Perkins, Dan Smith Keller and Frank Ludolph.

"Image: Power-Glove-image-layed-out.jpb," from Wikipedia, http://en.wikipedia.org/wiki/Image:Power-Glove-image-layed-out.jpg retrieved on Aug. 12, 2006.

"Controllers-Booster Grip," AtariAge: Have You Played Atari Today? www.atariage.com/controller_page.html?SystemID=2600&ControllerID=18.

"Controllers- Atari Space Age Joystick," AtariAge: Have You Played Atari Today? www.atariage.com/controller_page.html?SystemID=2006&ControllerID=12.

"This is the Revolution Nintendo Style," Electro-Plankton Weblog, http://www.tranism.com/weblog/2005/09/, Sep. 15, 2005, 2 pgs.

CNET News.com, http://news.com.com/2300-10433-6070295-2.html?tag=ne.gall.pg, "Nintendo Wii Swings Into Action," May 25, 2006, 1 pg.

Gyration Ultra Cordless Optical Mouse, User Manual, 1-15, Gyration Inc., Saratoga, CA (2003).

Gyration Ultra Cordless Optical Mouse, Setting Up Ultra Mouse, Gyration Quick Start Card part No. DL00071-0001, Rev. A, Gyration Inc. (Jun. 2003).

The Video Mouse: A Camera-based Multi-Degree-of-freedom input Device, Hinckley, Ken, et al., CHI Letters vol. 1, 1, UIST '99, Ashville, NC pp. 103-112 (1999).

"Design of All-Accelerometer Intertial Measurement Unit for Tremor Sensin in Hand-held Microsurgical Instrument," *Proceeding of the 2003 IEEE International Conference on Robotics & Automation*; Sep. 14-19, 2003; pp: 1781- 1786.

"Vision and Intertial Sensor Corporation Using Gravity as a Vertical Reference;" *IEEE Transactions on Pattern and Analysis and Machine Intelligence*, vol. 25, No. 12, Dec. 2003 by Jorge Lobo and Jorge Dias.

"A Zooming Web Browser," Benjamin B. Bederson, James D. Hollan, Jason Stewart, David Rogers, Allison Druin, David Vick, Computer Science Department, University of New Mexico {bederson, hoolan, jasons, drogers, Allison, dvick}@cs.unum.edu, http://www.cs.unm.edu/pad++.

"The Macintosh in 1984," Location: GUIs>Apples>Macintosh in 1984.

"A Reusable Software Architecture for Manual Controller Integration," *Proceedings of the 1997 IEEE, International Conference on Robotics and Automation*, Apr. 1997 by Mitch Pryor, Chetan Kapoor, Rich Hooper, Delbert Tesar.

"An Intertial Measurement Unit for User Interfaces," *Submitted to the Program in Media Arts and Sciences, School of Architecture and Planning, in partial fulfillment of the requirements for the degree of Master of Science in Media Arts and Sciences*, Sep. 2000 by Ari Yosef Benbasat.

"Free-space 'Tilt' Game Controller for Sony Playstation Uses Scenix Chip: SX Series IC Processes Spatial Data In Real Time For On-Screen Positioning," *Business Wire*, Dec. 6, 1999.

"Cordless GyroRemote & Mobile Keyboard," *Gyration RF200 Professional Series*, Hinckley, Ken, et al.

"Human movement tracking technology," *Hand Centered Studies of Human Movement Project, Technical Report 94-1*, 1994, by Axel Mulder and Simon Fraser.

"Hawkeye zooms in on Mac screens with wireless infrared penlight pointer." (Pointer Systems Inc. introduces Hawkeye) (Brief Article) (Product Announcement), May-93, *MacWEEK*, by Nathalie Welch.

"Logitech announces worldwide availability of MAGELLAN 3D Controller, bassed on space shuttle robotics technology: 3D Controller allows users to manipulate 3D objects in CAD/CAM and visual simulation applications," Apr. 14, 1997, *Business Wire*.

"New Pads lack control," *The Times English*, by Stuart Miles, Dec. 6, 1999.

"Noise Effects On Centroid Tracker Aim Point Estimation," *Ieee Transactions on Aerospace and Electronics Systems*, by Don R. Van Rheeden and Richard A. Jones, Mar. 1988.

"Pegasus' Wireless PenCell Writes On Thin Air with ART's Handwriting Recognition Solutions," *Business Editors/High Tech Writers Telecom Israel 2000 Hall 29, Booth 19-20*, Nov. 7, 2000.

"Virtual Reality Resource Guide," *VR Resource Guide*, by Jenny Heath, May 1994.

"Power Glove," from Wikipedia, http://en.wikipedia.org/wiki/Power Glove, retrieved on Aug. 12, 2006.

"New Game controlelrs Using Analog Devices' G-Force Tilt to be Featured at E3," News Article, Norwood, MA (May 10, 1999).

"The Rockin' Mouse: Integral 3D Manipulation on a Plane," *CHI 97 Electronic Publications: Papers*, by Ravin Balakrishnan, Thomas Baudel, Gordon Kurtenbach and George Fitzmaurice, Mar. 1997.

"Three-Axis MEMS-based Accelerometer From STMicroelectronics Targes Handheld Terminals," *PR Newswire*, Feb. 18, 2003.

"Tilta-Pointer: the Free-Space Pointing Device," Design Specification by Josh Lee, Cody May and Emily Huang, Fall 2004.

"Pad++: Advances in Multiscale Interfaces," *Conference Companion CHI '94, Boston, Massachusetts*, Apr. 24-28, 1994 by Benjamin B. Bederson, Larry Stead, Bell Communications Research and James D. Hollan, Computer Science Department, University of New Mexico.

"Game Controller" Wikipedia, Aug. 19, 2005, 7 pages, (08-071252); http//en.wikipedia.org/w/lindex.php?title=Gamecontroller&oldid=21390758.

"Camera in Direct3D," Dichtburn, Toymaker, Mar. 5, 2005, 5 pages.

"Single QFN package, high resolution and low consumption make LIS3L02 device ideal for user interface in mobile phones, PDAs and other hand-held terminals," *PR Newswire*, Feb. 18, 2003.

"Computer Pointer Controls 3D Images in Free Space (Internal Gyroscopes) (Three Dimensional)," *Pentagon Publishing Inc. 1991*, by Milt Leonard.

"Song Air-Pad Free-space 'Tilt' Game Controller for Sony Playstation Uses Scenix Chip; SX Series IC Processes Spatial Data in Real Time for On-Screen," *Business Wire*, Dec. 6, 1999.

"Coming up for airpad," *The Guardian*, Feb. 3, 2000.

Acciistick, picture of one-handed controller, 2 pages (Feb. 6, 2006).

"Five New Retailers To Carry Gyration's Gyropoint And Gyropoint Pro," *PR Newswire*, Jul. 8, 1996.

"ROBOCOP," *Orion Corp.*, Jul. 17, 1987 (release date of motion picture).

"Handheld data input device," Kennedy, P.J., IBM Technical Bulletin, vol. 26, No. 11, Apr, 1984, pp. 5826-5827.

"This is the Revolution, Nintendo Style," Sep. 15, 2005, http://www.tranism.com/weblog/techness/.

International Search Report Oct. 22, 1999 in PCT/JP99/04266 (not a counterpart to present application).

EP Search Report dated Jul. 13, 2007 in EP 06012611.7 -2218 (not a counterpart to present application).

International Search Report Jun. 6, 1997 in PCT/JP97/00322 (not a counterpart to present application).

International Search Report Sep. 28, 1999 in PCT/US99/09779 (not a counterpart to present application).

International Search Report Oct. 29, 1997 in PCT/US97/13751 (not a counterpart to present application).

EP Search Report dated Nov. 8, 2006 in EP 06008202.1 (not a counterpart to present application).

EP Search Report dated Nov. 8, 2007 in EP 07112880.5-2218 (not a counterpart of present application).

EP Search Report dated Jul. 28, 2006 in EP 06115249.2-2218 (not a counterpart of present application).

EP Search Report dated Jul. 28, 2006 in EP 06115077.7-2218 (not a counterpart of present application).

International Search Report Jun. 18, 2000 in PCT/US00/10579 (not a counterpart of present application).

EP Search Report dated Oct. 31, 2006 in EP 06016810.1-1241 (not a counterpart of present application).

Office Action issued Jul. 1, 2008 in corresponding JP Application No. 2006-124286 w/ at least partial translation.

Office Action issued Jun. 27, 2008 in corresponding JP Application No. 2006-124287.

International Search Report Jul. 29, 2003 in PCT/KR03/00802 (not a counterpart of present application).

International Search Report Jun. 19, 2003 in PCT/EP 03/00607 (not a counterpart of present application).

Ben Benderson's Publications http://www.cs.umd.edu/~bederson/paper, dated Nov. 12, 2008.

Ashida et al., entitled "Game Controller," U.S. Appl. No. 11/790,780, filed Apr. 17, 2007, pending.

Ikeda et al., entitled "Game Operating Device," U.S. Appl. No. 11/446,187, filed Jun. 5, 2006, pending.

Ikeda et al., entitled "Game Operating Device," U.S. Appl. No. 11/446,188, filed Jun. 5, 2006, pending/

Ikeda, et al., entitled "Video Game System with Wireless Modular Handheld Controller," U.S. Appl. No. 11/532,328, filed Sep. 15, 2006, pending.

EP Search Report dated Nov. 18, 2007 in EP 07 11 2880 (not a counterpart of present application).

U.S. Appl. No. 11/408,071 and its prosecution history including Jun. 18, 2007 Amendment and Apr. 25, 2007 Office Action.

Yoshizawa, Sumio, "1.4gemu de chikara to undo no kankei o kangaeyo (Force. Vbp), Visual Basic & Delphi de buturi ga wakaru rikigaku shimyureshon," CQ Publishing Co., Ltd. Feb. 20, 1998, First edition, p. 33 to 35 w/ an at least partial English-language translation.

Youtube Fox News Video: "Interview with Pat Goschy, the 'Real' Nintendo Wii Inventor" http://www.youtube.com/watch?v=oKtZysYGDLE.

Electro-Plankton Weblog, http//web.archive.org/web/20050201600432104/http://toymaker.info/games/html/camera.html.

ADXL202 Specification Sheet: Low Cost ±2 g Dual Axis i MEMs® Accelerometer with Digital Output; Analog Devices, Inc., 1998.

ADXL330 Specification Sheet: Small, Low Power, 3-Axis ±3 g i MEMs® Accelerometer; Analog Devices, Inc., 2007.

Pictures of Microsoft Xwand retrieved on May 13, 2009 from http://www.kf12.com/blogs/uploads/xwand.jpg and http://www.cs.cmu.edu/%7Edwilson/images/xwand.jpg.

Wilson, Andrew D., et al.; "Demonstration of the XWand Interface for Intelligent Spaces"; Microsoft Research; UIST '02 Companion; pp. 37-38.

Wilson, Daniel, et al.; "Gesture Recognition Using the XWand"; Robotics Institute; Carnegie Mellon University; tech report CMU-RI-TR-04-57; Apr. 2004.

Wilson, Andy, "XWand: UI for Intelligent Environments"; Apr. 26, 2004; retrieved May 12, 2009 from http://research.microsoft.com/en-us/um/people/awilson/wand/default.htm.

Wilson, Andrew, et al.; "XWand: UI for Intelligent Spaces"; Microsoft Research; CHI 2003, Apr. 5-10, 2003; Ft. Lauderdale, FL.

SELECTECH Air Mouse, Description; retrieved on May 5, 2009 from http://cgi.ebay.com.my/ws/eBayISAPI.dll?ViewItem&item=350096666675&indexURL.

* cited by examiner

INCLINATION CALCULATION APPARATUS AND INCLINATION CALCULATION PROGRAM, AND GAME APPARATUS AND GAME PROGRAM

CROSS REFERENCE TO RELATED APPLICATION

The disclosure of Japanese Patent Application No. 2006-087160 is incorporated herein by reference.

BACKGROUND

1. Field

The present exemplary embodiment to an inclination calculation apparatus and an inclination calculation program, and more specifically to an inclination calculation apparatus and an inclination calculation program for calculating an inclination of an input device using an output from acceleration detection means included in the input device.

2. Description of Background Art

Conventionally, technologies for calculating an inclination of a device including acceleration detection means have been proposed. For example, patent document 1 (Japanese Laid-Open Patent Publication No. 2001-159951) describes an information processing device including acceleration detection means. In this information processing device, an inclination of the device is calculated from an acceleration detected by the acceleration detection means (an angle of the device with respect to a direction of gravity), and an operation command is generated using the calculated inclination. According to such a method for calculating an inclination of a device using the acceleration detection means, the inclination of the device is calculated by calculating the direction of an acceleration of gravity detected by the acceleration detection means.

However, the technology described in patent document 1 has a problem in that since the inclination of the input device is calculated only from the detected acceleration, the detected inclination may not be correct. When, for example, the device is being moved by the user or being vibrated by the destabilization of the user's hand, the detected acceleration includes acceleration components caused by an inertial force in addition to the acceleration of gravity. Therefore, the direction of the detected acceleration is offset from the direction of the acceleration of gravity. As a result, an accurate inclination cannot be calculated.

According to the technology described in patent document 1, processing for correcting the inclination so as to be as close as possible to the accurate value is executed; for example, a low-frequency component is extracted from the detected acceleration. However, even with such processing, a method of using only the acceleration has a limit in terms of the accuracy of the calculated inclination. When processing for correcting the inclination is executed, there occurs another problem in that the calculation of the inclination is delayed with respect to the detection of the acceleration.

SUMMARY OF PRESENT NON-LIMITING EXEMPLARY EMBODIMENTS

Therefore, one aspect of the present invention is to provide an inclination calculation apparatus and an inclination calculation program capable of performing highly precise calculation of an inclination of an input device to be used as an operation input while utilizing the advantages of calculating the inclination using a detected acceleration.

The present exemplary embodiments have the following features to attain the object mentioned above. The reference numerals, additional explanations and the like in parentheses in this section of the specification indicate the correspondence with the embodiments described later for easier understanding of the present invention and do not limit the present invention in any way.

A first aspect of present exemplary embodiments is directed to an inclination calculation apparatus (game apparatus 3) for sequentially calculating an inclination of an input device (controller 7) operable in terms of a posture thereof. The input device includes acceleration detection means (acceleration sensor 37) for detecting an acceleration in at least two axial directions and imaging means (imaging element 40) for taking an image of two imaging targets. The inclination calculation apparatus comprises image information processing means (CPU 10, etc. for executing step S3; hereinafter, only the corresponding step number(s) will be mentioned in this section), acceleration information processing means (step S4), and inclination calculation means (step S5). The image information processing means sequentially calculates first inclination information (first vector data 531) representing an inclination of the input device from positions of the two imaging targets (markers 8a and 8b) in a taken image obtained by the imaging means. The acceleration information processing means sequentially calculates second inclination information (second vector data 533) representing an inclination of the input device from an acceleration detected by the acceleration detection means. The inclination calculation means calculates an inclination (output vector) of the input device using the first inclination information and the second inclination information.

In a second aspect of present non-limiting, exemplary embodiments, the inclination calculation means may select one of a calculation method using the first inclination information (first method) and a calculation method using the second inclination information (second method), and calculate the inclination of the input device by the selected calculation method.

In a third aspect of present non-limiting, exemplary embodiments the inclination calculation apparatus may further comprise first determination means (step S21) for determining whether or not calculation of the first inclination information by the image information processing means was successful. In this case, the inclination calculation means calculates the inclination of the input device using at least the first inclination information when the first determination means determines that the calculation of the first inclination information was successful (step S28), and calculates the inclination of the input device using the second inclination information without using the first inclination information when the first determination means determines that the calculation of the first inclination information was unsuccessful (step S22).

In a fourth aspect of present non-limiting, exemplary embodiments the inclination calculation apparatus may further comprise second determination means (step S42) for determining whether or not the inclination of the input device is within a range in which the imaging means is assumed to be capable of taking an image of the two imaging targets. In this case, the inclination calculation means calculates the inclination of the input device using at least the first inclination information when the second determination means determines that the inclination of the input device is within the range (step S28), and calculates the inclination of the input device using the second inclination information without using the first inclination information when the second determination means determines that the inclination of the input device is outside the range (step S22).

In a fifth aspect of present non-limiting, exemplary embodiments the acceleration detection means may be capable of detecting an acceleration in three axial directions including one axial direction (Z' axis) along an imaging direction of the imaging means. In this case, the second determination means determines whether or not the inclination of the input device is within the range in accordance with whether or not a magnitude of the acceleration in the one axial direction along the imaging direction is equal to or less than a predetermined threshold value.

In a sixth aspect of present non-limiting, exemplary embodiments the acceleration detection means may be capable of detecting an acceleration in at least two axial directions (X' axis and Y' axis) which are not along an imaging direction of the imaging means. In this case, the second determination means determines whether or not the inclination of the input device is within the range in accordance with whether or not a magnitude of the acceleration in the two axial directions which are not along the imaging direction is equal to or greater than a predetermined threshold value.

In a seventh aspect of present non-limiting, exemplary embodiments the inclination calculation means may include comparison means (steps S25 and S26) and correction means (step S27). The comparison means compares the first inclination information and the second inclination information. The correction means sets, as the inclination of the input device, an inclination obtained by correcting the inclination represented by the first inclination information in accordance with the comparison result obtained by the comparison means.

In an eighth aspect of present non-limiting, exemplary embodiments the comparison means may compare a direction of the inclination represented by the first inclination information and a direction of the inclination represented by the second inclination information, and determine whether the two directions are closer to being identical to each other or closer to being opposite to each other. In this case, the correction means performs a correction for making the direction of the inclination represented by the first inclination information opposite when the two directions are determined to be closer to being opposite to each other.

In a ninth aspect of present non-limiting, exemplary embodiments the inclination calculation apparatus may further comprise third determination means (step S24) for determining whether or not a change amount of a direction of the acceleration detected by the acceleration detection means is equal to or less than a predetermined value. In this case, the correction means performs a correction only when the determination result of the third determination means is positive.

In a tenth aspect of present non-limiting, exemplary embodiments the inclination calculation apparatus may further comprise fourth determination means for determining whether or not a difference between a magnitude of the acceleration detected by the acceleration detection means and a magnitude of an acceleration of gravity is equal to or less than a predetermined value. In this case, the correction means performs a correction only when the determination result of the fourth determination means is positive.

In an eleventh aspect of present non-limiting, exemplary embodiments the inclination calculation apparatus may further comprise fifth determination means for determining whether or not a change amount of a value of the acceleration detected by the acceleration detection means is equal to or less than a predetermined value. In this case, the correction means performs a correction only when the determination result of the fifth determination means is positive.

The present non-limiting, exemplary embodiments may be provided in the form of an inclination calculation program for causing a computer of an inclination calculation apparatus to execute the above-described invention. The present non-limiting, exemplary embodiments may be provided in the form of a game apparatus using an inclination calculated by the above invention as an operation input for a game, or in the form of a game program for causing a computer of the game apparatus to execute the above-described invention.

According to the first aspect, the image information processing means calculates the first inclination information using the taken image. Therefore, the inclination of the controller 7 can be accurately calculated. The acceleration information processing means calculates the second inclination information using the acceleration. Therefore, even when the image information processing means cannot calculate the first inclination information, the second inclination information can be calculated. According to this aspect, a final inclination is calculated using the first and second inclination information. Thus, the inclination can be calculated utilizing the advantages of both the first method of calculating the inclination using the taken image and the second method of calculating the inclination using the acceleration. More specifically, while the advantage of the second method of being capable of constantly calculating the inclination is utilized, the inclination can be calculated with high precision by the first method.

According to the second aspect, one of the first inclination information and the second inclination information is selected. Thus, more suitable information among the two types of inclination information can be used to calculate the inclination of the input device.

According to the third aspect, when the first inclination information is calculated, the inclination is calculated using the first inclination information. Therefore, the inclination of the controller 7 can be accurately calculated. In addition, when the first inclination information is not calculated, the inclination is calculated using the second inclination information. Even if the first inclination information is not calculated, the inclination can be calculated. Thus, the inclination of the controller 7 is accurately calculated, and the situation where the inclination cannot be calculated is avoided.

According to the fourth aspect, the second determination means can determine whether or not an image of the imaging targets can be taken by the imaging means. Only when it is determined that the image of the imaging targets can be taken, the inclination of the input device is calculated using the first inclination information. When the image of the imaging targets cannot be taken by the imaging means, the image processing means cannot calculate the first inclination information or calculates inaccurate inclination information. According to this aspect, an inaccurate inclination of the input device can be prevented from being calculated based on inaccurate inclination information. Therefore, the inclination of the input device can be calculated more accurately.

According to the fifth aspect, the determination by the second determination means is facilitated using the magnitude of the acceleration in one axial direction along the imaging direction.

According to the sixth aspect, the determination by the second determination means is facilitated using the magnitude of the acceleration in two axial directions which are not along the imaging direction.

According to the seventh aspect, the first inclination information is corrected in accordance with the comparison result between the first inclination information and the second inclination information. Therefore, the first inclination information can be calculated more accurately. As a result, the inclination of the input device can be calculated more accurately.

According to the eighth aspect, the direction of the inclination represented by the first inclination information is corrected to be opposite in accordance with the direction of the inclination represented by the second inclination information. With a method of calculating an inclination from an image of two imaging targets, the direction of the information to be calculated may possibly be opposite. According to this aspect, when the direction of the inclination represented by the first inclination information is opposite, the first inclination information is corrected using the second inclination information. Therefore, the first inclination information can be calculated more accurately. As a result, the inclination of the input device can be calculated more accurately.

According to the ninth aspect, only when the change amount of the direction of the acceleration is equal to or less than a predetermined value, the first inclination information is corrected. Based on the change amount of the direction of the acceleration, it can be determined whether or not the input device is being violently moved. When the input device is being violently moved, the possibility that the detected acceleration is not accurate is high. According to this aspect, when the detected acceleration is not accurate, the above-mentioned correction using the acceleration is not performed. Therefore, the correction can be performed more accurately.

According to the tenth aspect, only when the difference between the magnitude of the acceleration and the magnitude of the acceleration of gravity is equal to or less than a predetermined value, the first inclination information is corrected. Based on the difference, it can be determined whether or not the input device is being violently moved. When the input device is being violently moved, the possibility that the detected acceleration is not accurate is high. According to this aspect, when the detected acceleration is not accurate, the above-mentioned correction using the acceleration is not performed. Therefore, the correction can be performed more accurately.

According to the eleventh aspect, only when the change amount of the value of the acceleration is equal to or less than a predetermined value, the first inclination information is corrected. Based on the change amount of the value of the acceleration, it can be determined whether or not the input device is being violently moved. When the input device is being violently moved, the possibility that the detected acceleration is not accurate is high. According to this aspect, when the detected acceleration is not accurate, the above-mentioned correction using the acceleration is not performed. Therefore, the correction can be performed more accurately.

These and other features, aspects and advantages of the present invention will become more apparent from the following detailed description of the present invention when taken in conjunction with the accompanying drawings.

DESCRIPTION OF THE NON-LIMITING, EXEMPLARY EMBODIMENTS

First Embodiment

Figure 1:
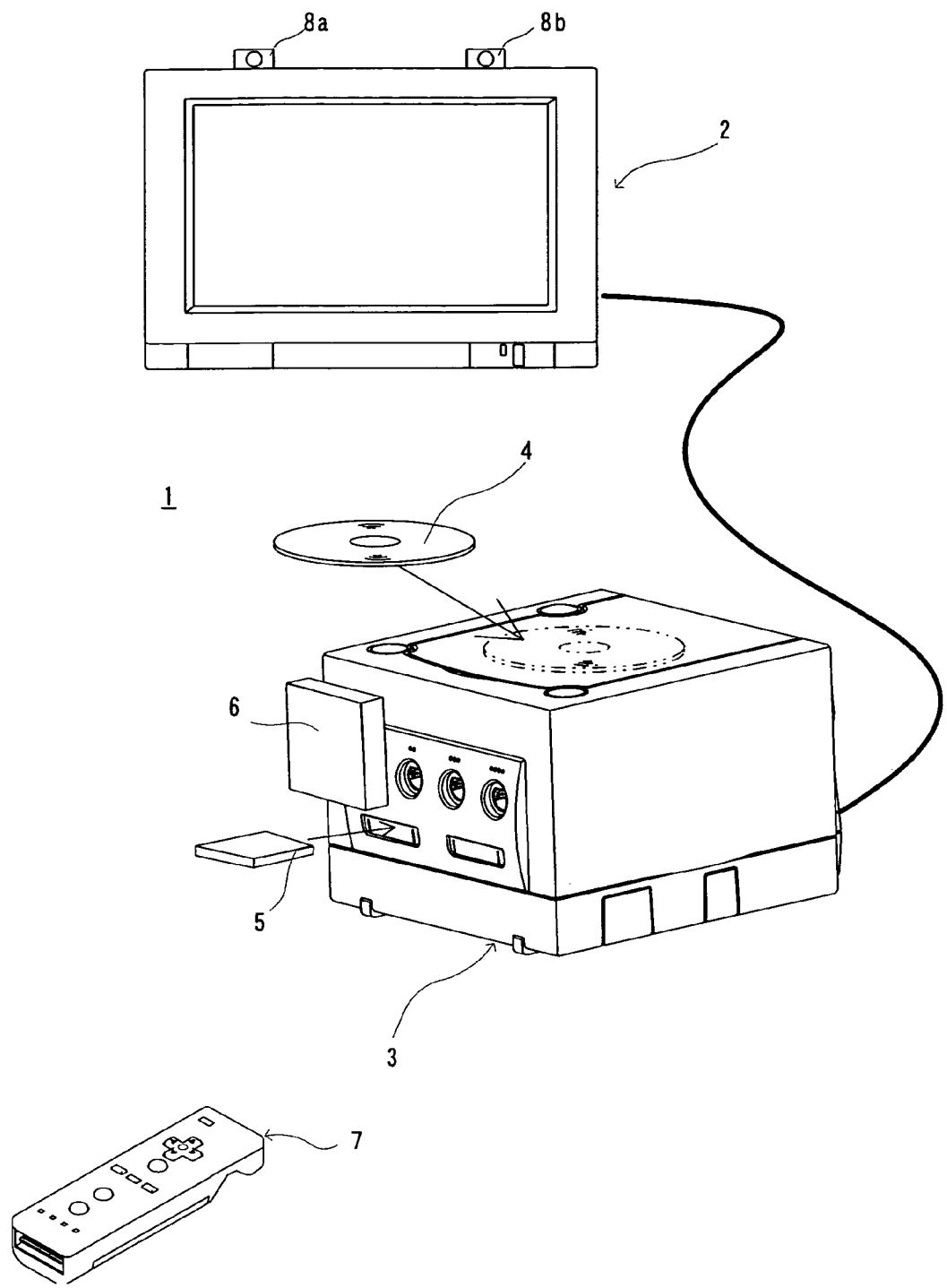
FIG. 1 is an external view of a game system including a game apparatus 3 as an exemplary inclination calculation apparatus according to one embodiment of the present invention.

With reference to FIG. 1, a game system 1 including a game apparatus as an example of an inclination calculation apparatus according to a first embodiment of the present invention will be described. FIG. 1 is an external view illustrating the game system 1. In the following exemplary description, the game apparatus according to the present invention is of an installation type.

As shown in FIG. 1, the game system 1 includes an installation type game apparatus (hereinafter, referred to simply as a "game apparatus") 3, which is connected to a display (hereinafter, referred to as a "monitor") 2 such as a home-use TV receiver including a speaker via a connection cord, and a controller 7 for giving operation data to the game apparatus 3. Two markers 8a and 8b are provided in the vicinity of the monitor 2 (above the screen of the monitor 2 in FIG. 1). The markers 8a and 8b are specifically infrared LEDs, and each outputs infrared light forward from the monitor 2. The game apparatus 3 is connected to a receiving unit 6 via a connection terminal. The receiving unit 6 receives operation data which is wirelessly transmitted from the controller 7. The controller 7 and the game apparatus 3 are connected to each other by wireless communication. On the game apparatus 3, an optical disc 4 as an example of an exchangeable information storage medium is detachably mounted. The game apparatus 3 has, on a top main surface thereof, a power ON/OFF switch, a game processing reset switch, and an OPEN switch for opening a top lid of the game apparatus 3. When a player presses the OPEN switch, the lid is opened, so that the optical disc 4 is mounted or dismounted.

On the game apparatus 3, an external memory card 5 is detachably mounted when necessary. The external memory card 5 has a backup memory or the like mounted thereon for fixedly storing saved data or the like. The game apparatus 3 executes a game program or the like stored on the optical disc 4 and displays the result on the monitor 2 as a game image. The game apparatus 3 can also reproduce a state of a game played in the past using saved data stored on the memory card 5 and display the game image on the monitor 2. The player playing with the game apparatus 3 can enjoy the game by operating the controller 7 while watching the game image displayed on the display screen of the monitor 2.

The controller 7 wirelessly transmits operation data from a communication section 36 included therein (described later) to the game apparatus 3 connected to the receiving unit 6, using the technology of, for example, Bluetooth (registered trademark) The controller 7 is operation means for operating an operation target (an object displayed on the display screen of the monitor 2). The controller 7 includes an operation section having a plurality of operation buttons. As described later in detail, the controller 7 also includes an acceleration sensor 37 (described later) for detecting an acceleration in at least two axial directions perpendicular to each other. Data representing an acceleration detected by the acceleration sensor 37 is transmitted to the game apparatus 3 as a part of the operation data. The controller 7 also includes an imaging information calculation section 35 (described later) for taking an image seen from the controller 7. The imaging information calculation section 35 takes an image of each of the markers 8a and 8b located in the vicinity of the monitor 2. Coordinate set data representing the positions of the images of the markers 8a and 8b in the image taken by the imaging information calculation section 35 (taken image) is transmitted to the game apparatus 3 as a part of the operation data. The game apparatus 3 calculates an inclination of the controller 7 using the data representing the acceleration and the coordinate set data.

Figure 2:
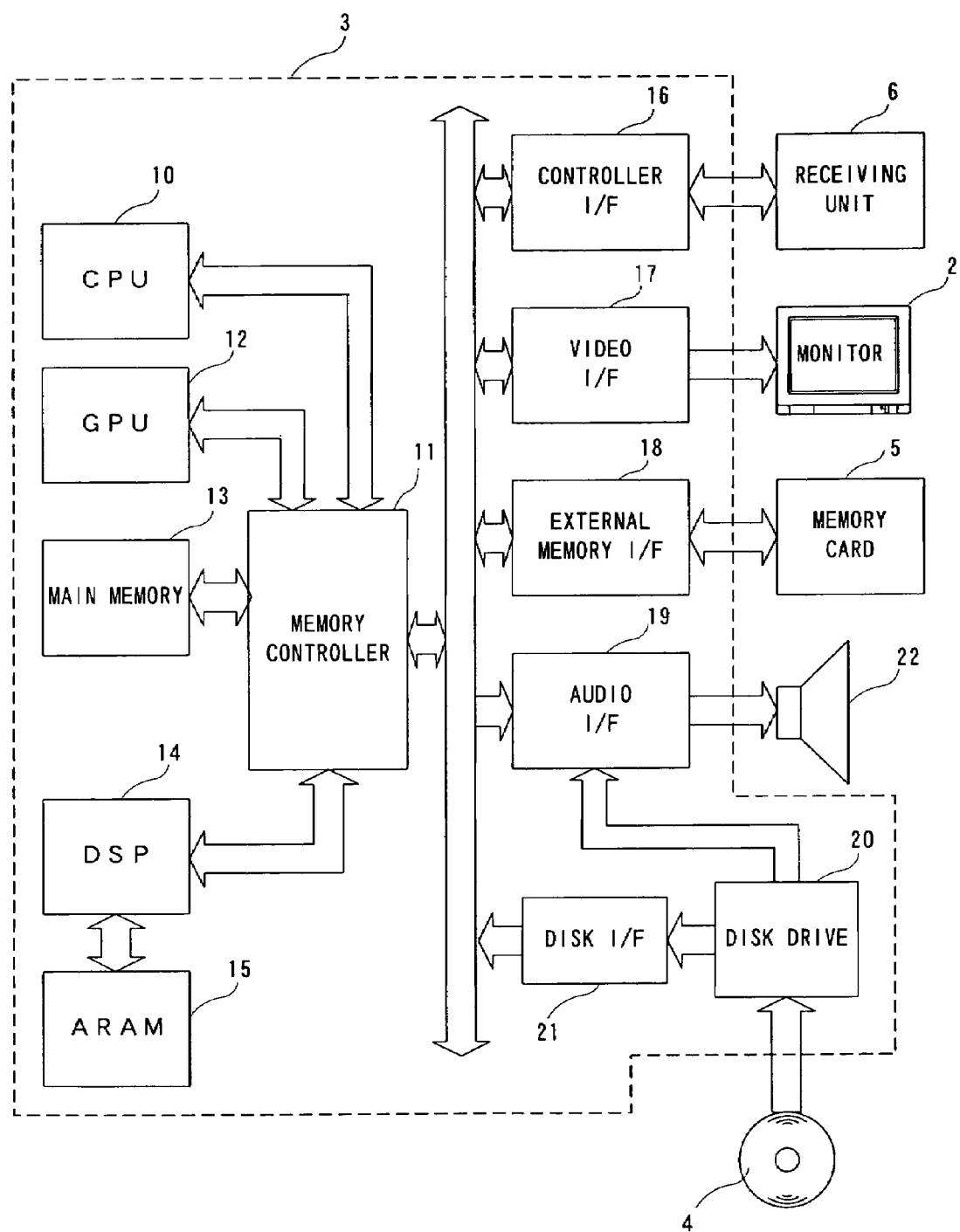
FIG. 2 is a functional block diagram of the game apparatus 3.

With reference to FIG. 2, a structure of the game apparatus 3 will be described. FIG. 2 is a functional block diagram of the game apparatus 3.

As shown in FIG. 2, the game apparatus 3 includes, for example, a RISC CPU (central processing unit) 10 for executing various types of programs. The CPU 10 executes a start program stored in a boot ROM (not shown) to, for example, initialize memories including a main memory 13, and then executes a game program stored on the optical disc 4 to perform game processing or the like in accordance with the game program. The CPU 10 is connected to a GPU (Graphics Processing Unit) 12, the main memory 13, a DSP (Digital Signal Processor) 14, and an ARAM (Audio RAM) 15 via a memory controller 11. The memory controller 11 is connected to a controller I/F (interface) 16, a video I/F 17, an external memory I/F 18, an audio I/F 19, and a disc I/F 21 via a predetermined bus. The controller I/F 16, the video I/F 17, the external memory I/F 18, the audio I/F 19 and the disc I/F 21 are respectively connected to the receiving unit 6, the monitor 2, the external memory card 5, a speaker 22 and a disc drive 20.

The GPU 12 performs image processing based on an instruction from the CPU 10. The GPU 12 includes, for example, a semiconductor chip for performing calculation processing necessary for displaying 3D graphics. The GPU 12 performs the image processing using a memory dedicated for image processing (not shown) and a part of the storage area of the main memory 13. The GPU 12 generates game image data and a movie to be displayed on the display screen of the monitor 2 using such memories, and outputs the generated data or movie to the monitor 2 via the memory controller 11 and the video I/F 17 as necessary.

The main memory 13 is a storage area used by the CPU 10, and stores a game program or the like necessary for processing performed by the CPU 10 as necessary. For example, the main memory 13 stores a game program read from the optical disc 4 by the CPU 10, various types of data or the like. The game program, the various types of data or the like stored in the main memory 13 are executed by the CPU 10.

The DSP 14 processes sound data or the like generated by the CPU 10 during the execution of the game program. The DSP 14 is connected to the ARAM 15 for storing the sound data or the like. The ARAM 15 is used when the DSP 14 performs predetermined processing (for example, storage of the game program or sound data already read). The DSP 14 reads the sound data stored in the ARAM 15 and outputs the sound data to the speaker 22 included in the monitor 2 via the memory controller 11 and the audio I/F 19.

The memory controller 11 comprehensively controls data transfer, and is connected to the various I/Fs described above. The controller I/F 16 includes, for example, four controller I/Fs, and communicably connects the game apparatus 3 to an external device which is engageable via connectors of the controller I/Fs. For example, the receiving unit 6 is engaged with such a connector and is connected to the game apparatus 3 via the controller I/F 16. As described above, the receiving unit 6 receives the operation data from the controller 7 and outputs the operation data to the CPU 10 via the controller I/F 16. In other embodiments, the game apparatus 3 may include a receiving module for receiving the operation data transmitted from the controller 7, instead of the receiving unit 6. In this case, the operation data received by the receiving module is output to the CPU 10 via a predetermined bus. The video I/F 17 is connected to the monitor 2. The external memory I/F 18 is connected to the external memory card 5 and is accessible to a backup memory or the like provided in the external card 5. The audio I/F 19 is connected to the speaker 22 built in the monitor 2, and is connected such that the sound data read by the DSP 14 from the ARAM 15 or sound data directly output from the disc drive 20 is output from the speaker 22. The disc I/F 21 is connected to the disc drive 20. The disc drive 20 reads data stored at a predetermined reading position of the optical disc 4 and outputs the data to a bus of the game apparatus 3 or the audio I/F 19.

Figure 3A:
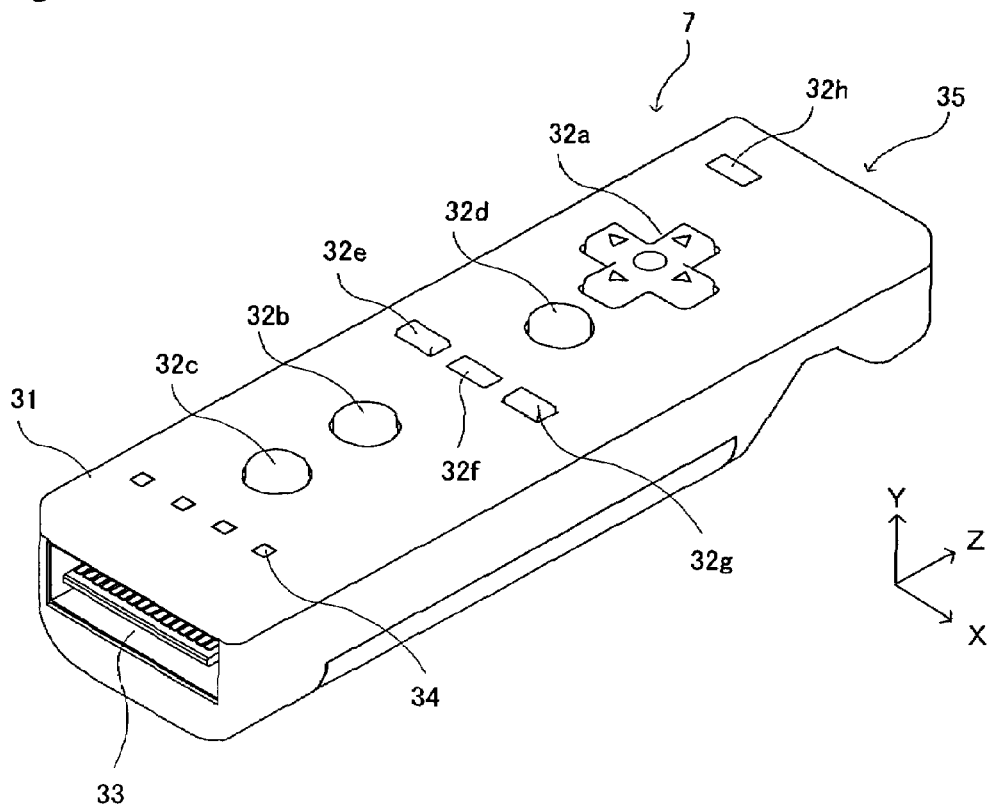
FIG. 3A is an isometric view of a controller 7.
Figure 3B:
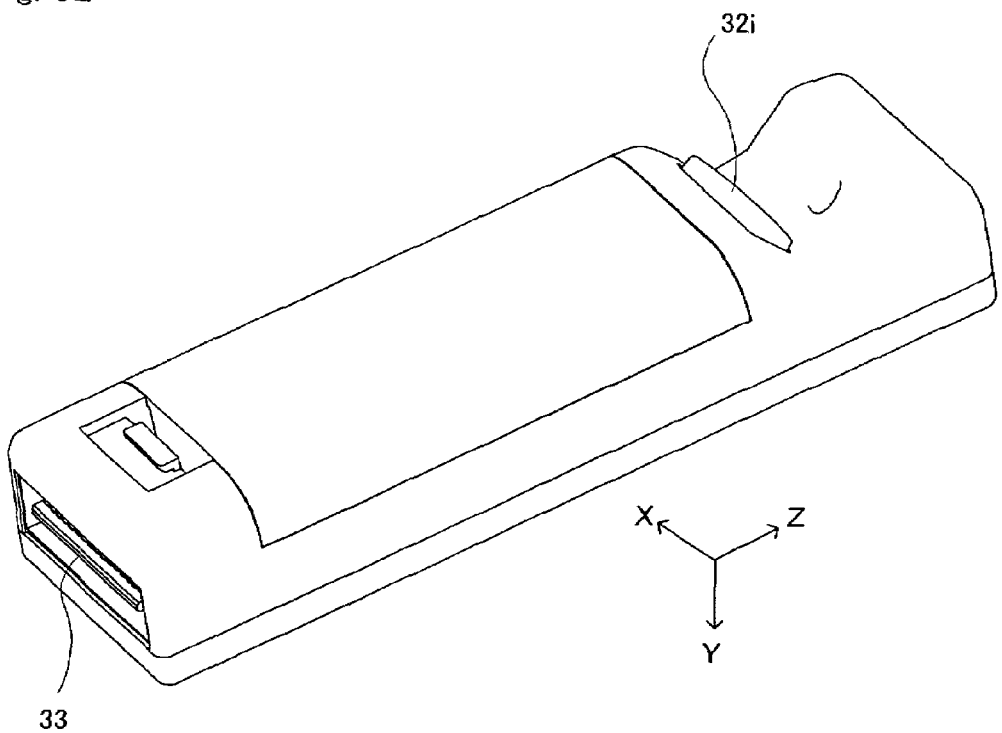
FIG. 3B is another isometric view of the controller 7.
Figure 4:
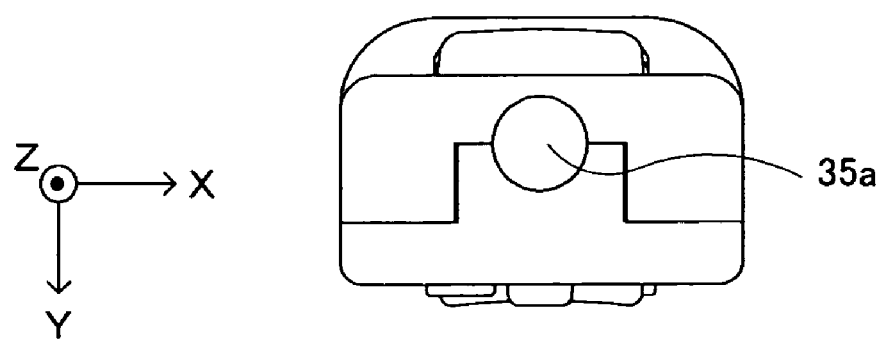
FIG. 4 is a front view of the controller 7.

With reference to FIG. 3A through FIG. 8, the controller 7 as an exemplary input device will be described. FIG. 3A through FIG. 5B are external isometric views of the controller 7. FIG. 3A is an isometric view of the controller 7 seen from the top rear side thereof. FIG. 3B is an isometric view of the controller 7 seen from the bottom rear side thereof. FIG. 4 is a front view of the controller 7.

As shown in FIG. 3A, FIG. 3B and FIG. 4, the controller 7 includes a housing 31 formed by plastic molding or the like. The housing 31 has a generally parallelepiped shape extending in a longitudinal or front-rear direction (the Z-axis direction shown in FIG. 3A). The overall size of the housing 31 is small enough to be held by one hand of an adult or even a child. The player can use the controller 7 to perform a game operation of pressing buttons provided thereon, a game operation of changing the inclination of the controller 7 itself (the angle of the controller 7 with respect to a direction of gravity), and a game operation of changing the position or direction of the controller 7 itself. For example, the player can change the inclination of the controller 7 to move an operation target (object) appearing in the game space. Also for example, the player can rotate the controller 7 with the longitudinal direction thereof as an axis to move the operation target through processing of the linear acceleration signals generated by the acceleration sensor 37. The player can change the position indicated by the controller 7 on the display screen to move the object appearing in the game space. The "position indicated by the controller 7 on the display screen" is ideally a position at which a phantom straight line extending from a front end of the controller 7 in the longitudinal direction crosses the display screen of the monitor 2. However, it is not necessary that the "position indicated by the controller 7 on the display screen" is strictly such a position. It is sufficient that the game apparatus 3 can calculate a position in the vicinity thereof. Hereinafter, a position indicated by the controller 7 on the display screen will be referred to as an "indicated position" or an "indicated position by the controller 7". The longitudinal direction of the controller 7 (housing 31) will be sometimes referred to as an "indicated direction".

The housing 31 has a plurality of operation buttons. Provided on a top surface of the housing 31 are a cross key 32a, an X button 32b, a Y button 32c, a B button 32d, a select switch 32e, a menu switch 32f, and a start switch 32g. On a bottom surface of the housing 31, a recessed portion is formed. On a rear slope surface of the recessed portion, an A button 32i is provided. These buttons and switches are assigned various functions in accordance with the game program executed by the game apparatus 3, but this will not be described in detail because the functions are not directly relevant to the present invention. On the top surface of the housing 31, a power switch 32h is provided for remotely turning on or off the game apparatus 3.

Figure 5A:
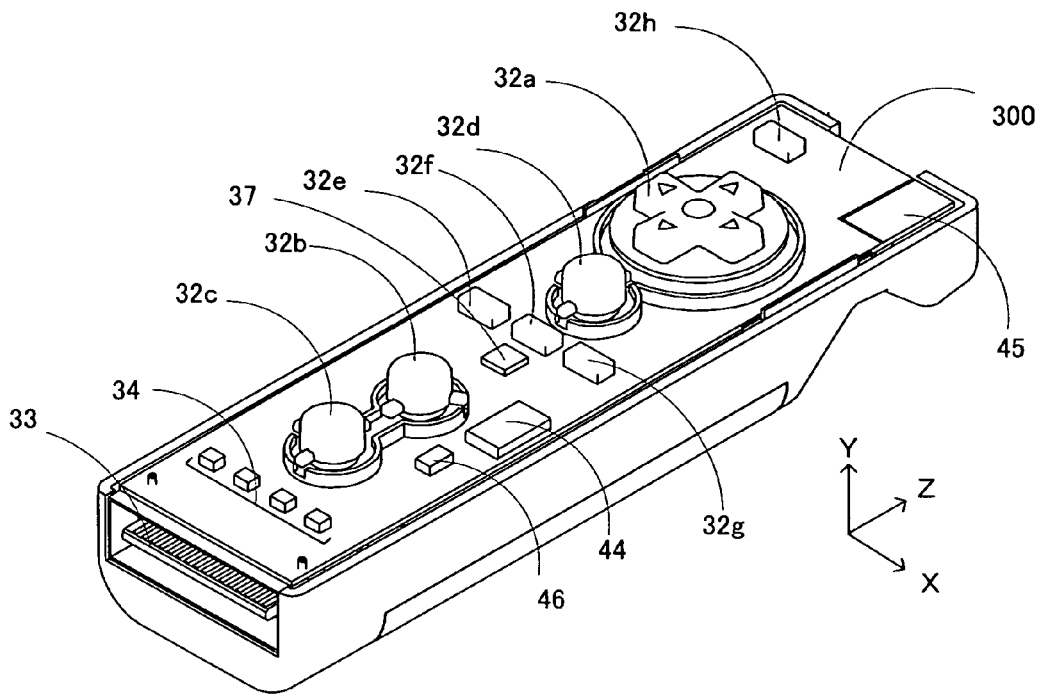
FIG. 5A is a view illustrating an internal structure of the controller 7.
Figure 5B:
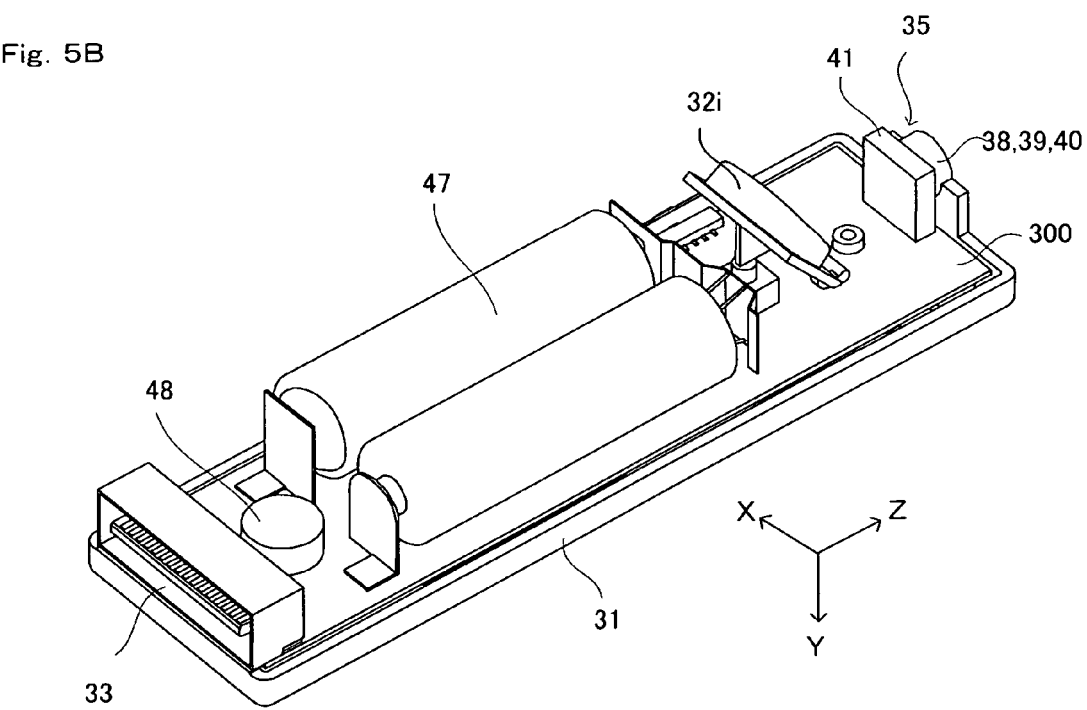
FIG. 5B is another view illustrating the internal structure of the controller 7.

The controller 7 has the imaging information calculation section 35 (FIG. 5B). As shown in FIG. 4, a light incident opening 35a of the imaging information calculation section 35 is provided on a front surface of the housing 31. On a rear surface of the housing 31, a connector 33 is provided. The connector 33 is, for example, a 32-pin edge connector, and is used for connecting the controller 7 to another device. In a rear part of the top surface of the housing 31, a plurality of LEDs 34 are provided. The controller 7 is assigned a controller type (number) so as to be distinguishable from the other controllers 7. The LEDs 34 are used for informing the player of the controller type which is currently set to controller 7 that he/she is using. Specifically, when the controller 7 transmits the operation data to the game apparatus 3, one of the plurality of LEDs 34 corresponding to the controller type is lit up.

Figure 6:
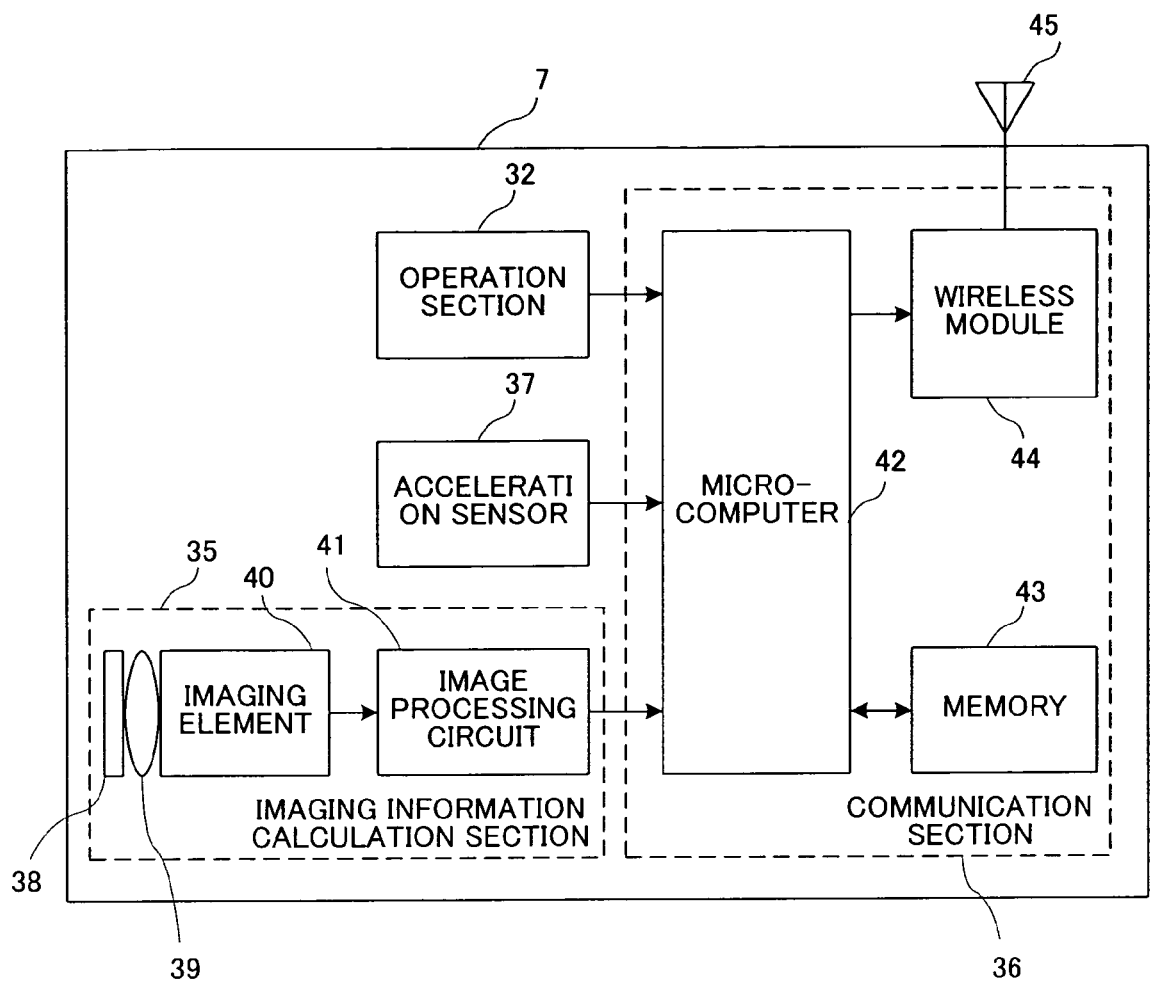
FIG. 6 is a block diagram illustrating a structure of the controller 7.

With reference to FIG. 5A, FIG. 5B and FIG. 6, an internal structure of the controller 7 will be described. FIG. 5A and FIG. 5B illustrate an internal structure of the controller 7. FIG. 5A is an isometric view illustrating a state where an upper casing (a part of the housing 31) of the controller 7 is removed. FIG. 5B is an isometric view illustrating a state where a lower casing (a part of the housing 31) of the controller 7 is removed. FIG. 5B shows a reverse side of a substrate 300 shown in FIG. 5A.

As shown in FIG. 5A, the substrate 300 is fixed inside the housing 31. On a top main surface of the substrate 300, the operation buttons 32a through 32h, the acceleration sensor 37, the LEDs 34, a quartz oscillator 46, a wireless module 44, an antenna 45 and the like are provided. These elements are connected to a microcomputer 42 (see FIG. 6) via lines (not shown) formed on the substrate 300 and the like. The wireless module 44 and the antenna 45 allow the controller 7 to act as a wireless controller. The quartz oscillator 46 generates a reference clock of the microcomputer 42 described later.

As shown in FIG. 5B, at a front edge of a bottom main surface of the substrate 300, the imaging information calculation section 35 is provided. The imaging information calculation section 35 includes an infrared filter 38, a lens 39, an imaging element 40 and an image processing circuit 41 located in this order from the front surface of the controller 7. These elements are attached to the bottom main surface of the substrate 300. At a rear edge of the bottom main surface of the substrate 300, the connector 33 is attached. The operation button 32i is attached on the bottom main surface of the substrate 300 rearward to the imaging information calculation section 35, and cells 47 are accommodated rearward to the operation button 32i. On the bottom main surface of the substrate 300 between the cells 47 and the connector 33, a vibrator 48 is attached. The vibrator 48 may be, for example, a vibration motor or a solenoid. The controller 7 is vibrated by an actuation of the vibrator 48, and the vibration is conveyed to the player holding the controller 7. Thus, a so-called vibration-responsive game is realized.

Figure 7:
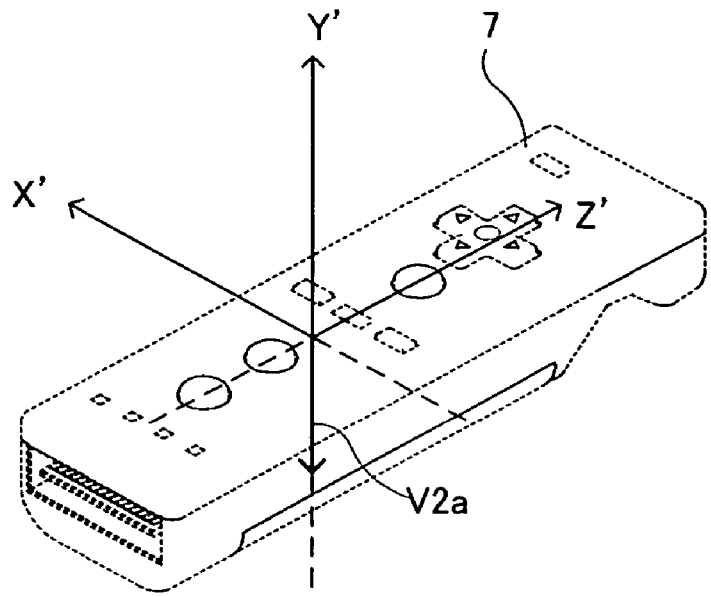
FIG. 7 is a view illustrating the relationship between the inclination of the controller 7 and the output from an acceleration sensor.
Figure 8:
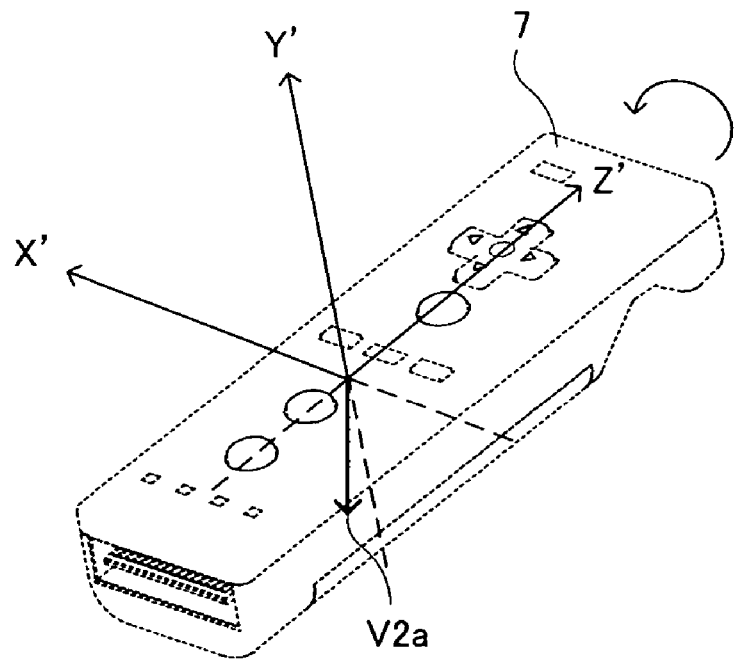
FIG. 8 is another view illustrating the relationship between the inclination of the controller 7 and the output from the acceleration sensor.

FIG. 6 is a block diagram showing the structure of the controller 7. The controller 7 includes the acceleration sensor 37 mentioned above. The acceleration sensor 37 detects an acceleration of the controller 7 (including an acceleration of gravity). Namely, the acceleration sensor 37 detects a force applied to the controller 7 (including gravity) and outputs the detected force as an acceleration. FIG. 7 and FIG. 8 show the relationship between the inclination of the controller 7 and the output of the acceleration sensor 37. As shown in FIG. 7 and FIG. 8, the acceleration sensor 37 detects an acceleration in each of three axial directions regarding the controller 7, i.e., the up-down direction (Y'-axis direction in FIG. 7), the left-right direction (X'-axis direction in FIG. 7), and the front-rear direction (the Z'-axis direction in FIG. 7). Namely, the acceleration sensor 37 detects an acceleration in a linear direction along each axis, and therefore an output from the acceleration sensor 37 represents a value of an acceleration in each axis. Therefore, the detected acceleration is represented as a three-dimensional vector in an X'-Y'-Z' coordinate system (see FIG. 7 and FIG. 8) which is set based on the controller 7. Herein, the upward direction regarding the controller 7 is set as a positive Y'-axis direction, the horizontal direction regarding the controller 7 is set as a positive Z'-axis direction, and the leftward direction regarding the controller 7 in the case where the controller 7 is viewed from the rear end thereof toward the front end thereof is set as a positive X'-axis direction.

As explained above, the controller 7 preferably includes a three-axis, linear acceleration sensor 37 that detects linear acceleration in each of the three axial directions described above. Alternatively, a two axis linear accelerometer that only detects linear acceleration along each of the X-axis and Y-axis (or other pair of axes) may be used in another embodiment depending on the type of control signals desired. As a non-limiting example, the three-axis or two-axis linear accelerometer 37 may be of the type available from Analog Devices, Inc. or STMicroelectronics N.V. Preferably, the acceleration sensor 37 is an electrostatic capacitance or capacitance-coupling type that is based on silicon micro-machined MEMS (microelectromechanical systems) technology. However, any other suitable accelerometer technology (e.g., piezoelectric type or piezoresistance type) now existing or later developed may be used to provide the three-axis or two-axis acceleration sensor 37.

As one skilled in the art understands, linear accelerometers, as used in acceleration sensor 37, are only capable of detecting acceleration along a straight line corresponding to each axis of the acceleration sensor. In other words, the direct output of the acceleration sensor 37 is limited to signals indicative of linear acceleration (static or dynamic) along each of the two or three axes thereof. As a result, the acceleration sensor 37 cannot directly detect movement along a non-linear (e.g. arcuate) path, rotation, rotational movement, angular displacement, tilt, position, attitude or any other physical characteristic.

However, through additional processing of the linear acceleration signals output from the acceleration sensor 37, additional information relating to the controller 7 can be inferred or calculated, as one skilled in the art will readily understand from the description herein. For example, by detecting static, linear acceleration (i.e., gravity), the linear acceleration output of the acceleration sensor 37 can be used to infer or calculate tilt or inclination of the object relative to the gravity vector by correlating tilt angles with detected linear acceleration. In this way, the acceleration sensor 37 can be used in combination with the micro-computer 42 (or another processor) to determine tilt, attitude or position of the controller 7. Similarly, various movements and/or positions of the controller 7 can be calculated or inferred through processing of the linear acceleration signals generated by the acceleration sensor 37 when the controller 7 containing the acceleration sensor 37 is subjected to dynamic accelerations by, for example, the hand of a user. In another embodiment, the acceleration sensor 37 may include an embedded signal processor or other type of dedicated processor for performing any desired processing of the acceleration signals output from the accelerometers therein prior to outputting signals to micro-computer 42. For example, the embedded or dedicated processor could convert the detected acceleration signal to a corresponding tilt angle when the acceleration sensor is intended to detect static acceleration (i.e., gravity).

FIG. 7 shows a state where an acceleration of gravity (vector V2a in FIG. 7) is directed downward regarding the controller 7. In this state, the value V2a of an acceleration detected by the acceleration sensor 37 (hereinafter, referred to as an "acceleration vector") is in a negative Y'-axis direction. In FIG. 7 and FIG. 8, it is assumed that the controller 7 is in a still state. In the state shown in FIG. 7, only the Y' coordinate value of the acceleration vector V2a is not zero, and both the X' coordinate value and the Z' coordinate value of the acceleration vector V2a are zero. FIG. 8 shows a state in which the controller 7 is inclined as a result of being rotated from the state shown in FIG. 7 around the Z' axis. In the state shown in FIG. 8, the direction of the acceleration vector V2a is changed from the state in FIG. 7. The X' coordinate value and the Y' coordinate value of the acceleration vector V2a are not zero, and the Z' coordinate value of the acceleration vector V2a is zero because the controller 7 has been rotated around the Z' axis. As shown in FIG. 7 and FIG. 8, the acceleration sensor 37 can detect a value of an acceleration having three axial directions regarding the controller 7 as components. Thus, a calculation handling the value of the acceleration as an acceleration vector having the three axial components is performed by software processing using a computer such as the micro-computer 42 or the CPU 10, and thus an inclination of the controller 7 can be calculated. Data representing the acceleration detected by the acceleration sensor 37 (acceleration data) is output to the communication section 36. In the first embodiment, the acceleration sensor 37 outputs a value in accordance with the acceleration sequentially (specifically, frame by frame). The game apparatus 3 performs a predetermined calculation handling the value as an acceleration vector to calculate the inclination (posture) of the controller 7, and executes game processing in accordance with the inclination.

In this embodiment, the magnitude of an acceleration which is detected when the controller 7 is in a still state, i.e., the magnitude of an acceleration which represents only an acceleration of gravity, is set as 1. For example, the values of the components of the acceleration vector V2a detected in the state shown in FIG. 7 are (0, 1, 0).

In the first embodiment, it is intended to calculate an inclination of the controller 7 in two axial directions vertical to the imaging direction of the imaging means, i.e., the X'-Y' directions. Therefore, in the first embodiment, an acceleration sensor for detecting an acceleration in only two axial directions (X'-Y' directions) may be used instead of the acceleration sensor 37 for detecting an acceleration in three axial directions. The acceleration sensor 37 is typically of a static capacitance type, but may be of any other system.

The controller 7 includes the operation section 32 (operation buttons), the imaging information calculation section 35, and the communication section 36 in addition to the acceleration sensor 37. In this embodiment, the controller 7 only needs to include acceleration detection means (the acceleration sensor 37) and may not absolutely need to include the operation section 32 or the imaging information calculation section 35.

Returning to FIG. 6, the imaging information calculation section 35 uses the image taken by the imaging means to calculate the positions of the markers 8a and 8b on the image. The imaging information calculation section 35 is a system for analyzing image data taken by imaging means and detecting the position of the center of gravity, the size and the like of an area having a high brightness in the image data. The imaging information calculation section 35 has, for example, a maximum sampling period of about 200 frames/sec., and therefore can trace and analyze even a relatively fast motion of the controller 7.

Specifically, the imaging information calculation section 35 includes the infrared filter 38, the lens 39, the imaging element 40 and the image processing circuit 41. The infrared filter 38 allows only infrared light to pass therethrough, among light incident on the front surface of the controller 7. The markers 8a and 8b located in the vicinity of the display screen of the monitor 2 are infrared LEDs for outputting infrared light forward from the monitor 2. Therefore, the provision of the infrared filter 38 allows the image of each of the markers 8a and 8b to be taken more accurately. The lens 39 collects the infrared light which has passed through the infrared filter 38 and outputs the infrared light to the imaging element 40. The imaging element 40 is a solid-state imaging device such as, for example, a CMOS sensor or a CCD. The imaging element 40 takes an image of the infrared light collected by the lens 39. Accordingly, the imaging element 40 takes an image of only the infrared light which has passed through the infrared filter 38 and generates image data. Hereinafter, an image taken by the imaging element 40 will be referred to as a "taken image". The image data generated by the imaging element 40 is processed by the image processing circuit 41. The image processing circuit 41 calculates the positions of the imaging targets (the markers 8a and 8b) in the taken image. The positions are represented in a coordinate system (x-y coordinate system) in which the downward direction of the taken image is a positive y-axis direction and the rightward direction of the taken image is a positive x-axis direction. The image processing circuit 41 outputs coordinate values indicating the respective positions of the markers 8a and 8b in the taken image to the communication section 36 as imaging data. Since these coordinate values vary in accordance with the direction or position of the controller 7 itself, the game apparatus 3 can calculate the direction and position of the controller 7 using these coordinate values.

The communication section 36 includes the microcomputer 42, a memory 43, the wireless module 44 and the antenna 45. The microcomputer 42 controls the wireless module 44 for wirelessly transmitting the data obtained by the microcomputer 42 while using the memory 43 as a storage area during processing.

Data which is output from the operation section 32, the acceleration sensor 37 and the imaging information calculation section 35 to the microcomputer 42 is temporarily stored in the memory 43. The wireless transmission from the communication section 36 to the receiving unit 6 is performed at a predetermined time interval. Since game processing is generally performed at a cycle of 1/60 sec., the wireless transmission needs to be performed at a cycle of a shorter time period. At the transmission timing to the receiving unit 6, the microcomputer 42 outputs the data stored in the memory 43 to the wireless module 44 as operation data. The wireless module 44 uses, for example, the Bluetooth (registered trademark) technology to modulate a carrier wave of a predetermined frequency with the operation data and radiate the resultant very weak electric signal from the antenna 45. Namely, the operation data is modulated into a very weak electric signal by the wireless module 44 and transmitted from the controller 7. The very weak electric signal is received by the receiving unit 6 on the side of the game apparatus 3. The received very weak electric signal is demodulated or decoded, so that the game apparatus 3 can obtain the operation data. The CPU 10 of the game apparatus 3 executes the game processing based on the obtained operation data and the game program.

The shape of the controller 7, and the shape, number, position or the like of the operation buttons and switches shown in FIG. 3A through FIG. 5B are merely exemplary, and maybe altered without departing from the scope of the present invention. The position of the imaging information calculation section 35 in the controller 7 (the light incident opening 35a of the imaging information calculation section 35) does not need to be on the front surface of the housing 31, and may be on another surface as long as light can enter from the outside of the housing 31. In this case, the "indicated direction" is a direction vertical to the light incident opening, i.e., the direction in which the imaging element 40 takes images of the imaging targets.

By using the controller 7, the player can perform a game operation of changing the inclination of the controller 7, of changing the position of the controller 7 itself, or of rotating the controller 7, in addition to the conventional game operation of pressing the operation buttons or switches. Hereinafter, the game operations using the controller 7 will be described.

Figure 9:
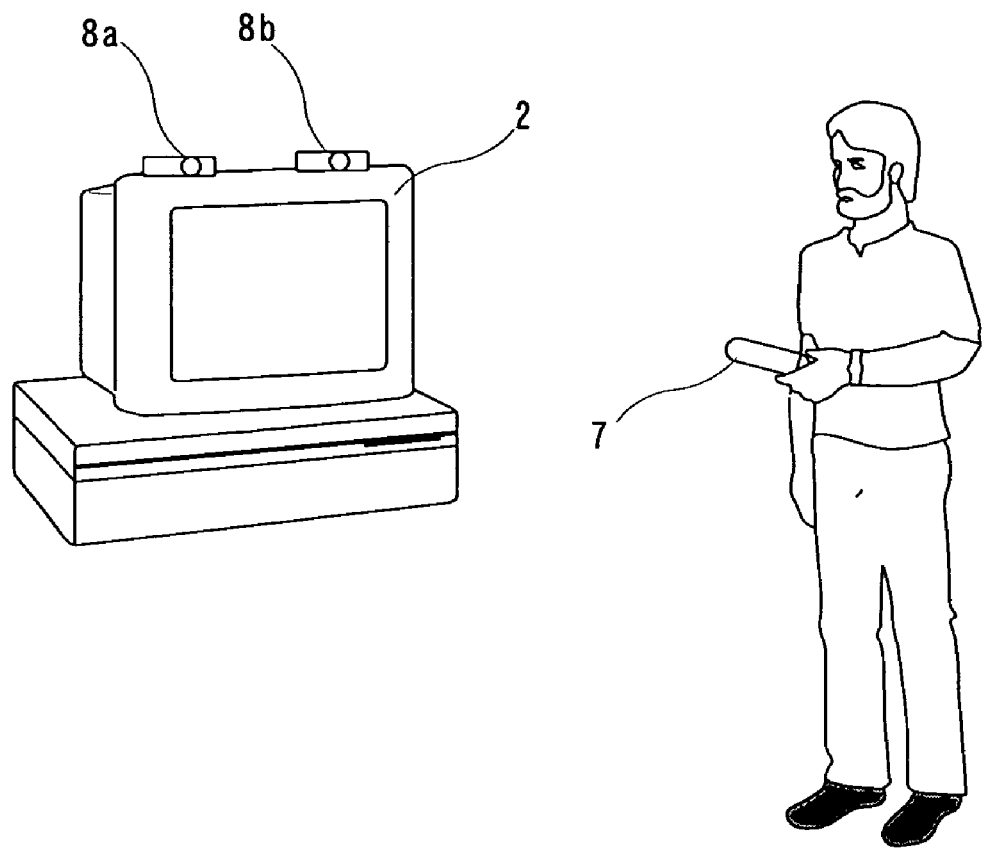
FIG. 9 shows a general view of a game operation using the controller 7.

FIG. 9 is a general view of a game operation using the controller 7. As shown in FIG. 9, when playing the game using the controller 7 with the game system 1, the player holds the controller 7 with one hand. The markers 8a and 8b are located parallel to the transverse or width direction of the monitor 2. In this embodiment, the player uses the controller 7 at almost the same height as the monitor 2 and holds the controller 7 in the state where the longitudinal direction of the controller 7 is almost parallel to the ground. The player holds the controller 7 such that the front surface of the controller 7 (having the light incident opening 35a by which the imaging information calculation section 35 takes the image of each of the markers 8a and 8b) faces the markers 8a and 8b. In this state, the player performs a game operation of changing the inclination of the controller 7, of changing the position indicated by the controller 7 on the display screen (indicated position), or of changing the distance between the controller 7 and the markers 8a and 8b.

Figure 10:
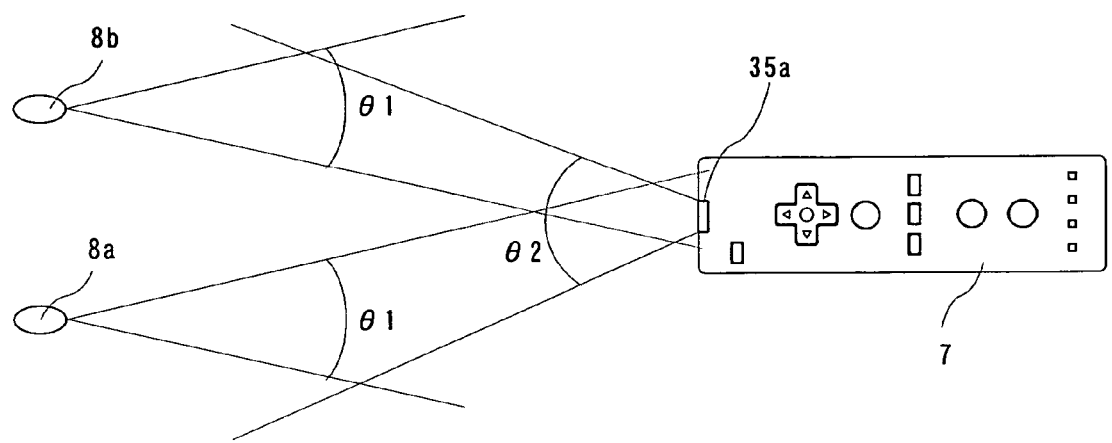
FIG. 10 illustrates viewing angles of markers 8a and 8b and the controller 7.

FIG. 10 illustrates the viewing angles of the markers 8a and 8b and the controller 7. As shown in FIG. 10, the markers 8a and 8b each radiate infrared light at a viewing angle θ1. The imaging element 40 of the imaging information calculation section 35 can receive light incident thereon at a viewing angle θ2 centered around the viewing direction of the controller 7. For example, the viewing angle θ1 of each of the markers 8a and 8b is 34° (half value angle), and the viewing angle θ2 of the imaging element 40 is 41°. The player holds the controller 7 at the position and the direction with which the imaging element 40 can receive the infrared light from both the markers 8a and 8b. Specifically, the player holds the controller 7 in a range in which at least one of the markers 8a and 8b exists in the viewing angle θ2 of the imaging element 40 and the controller 7 exists in the viewing angle θ1 of at least one of the markers 8a and 8b. In this state, the controller 7 can detect the marker 8a and/or the marker 8b. When the position or the direction of the controller 7 is outside the above-described range, the marker 8a and/or the marker 8b cannot be detected. Thus, the game apparatus 3 cannot calculate the inclination of the controller 7 using the taken image. Hereinafter, the above-described range will be referred to as a "detectable range".

Figure 11:
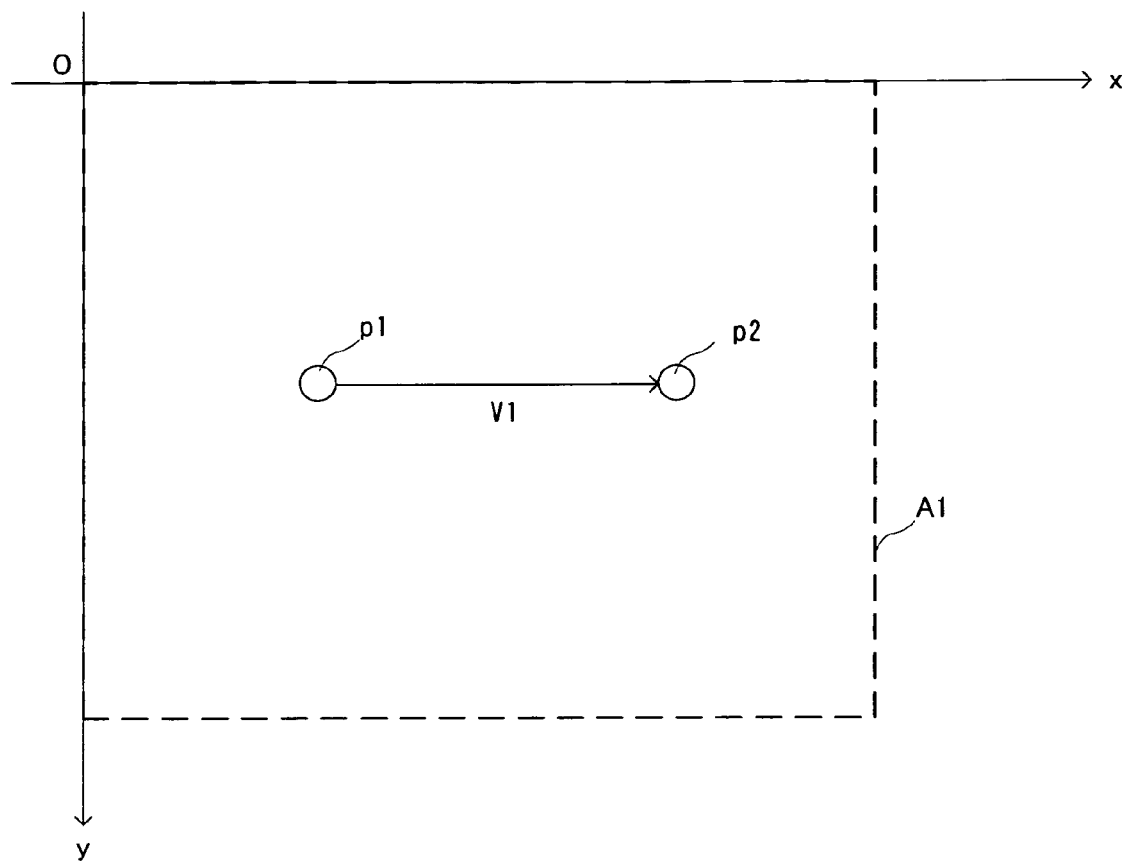
FIG. 11 shows an example of a taken image including target images.

In the case where the controller 7 is held in the detectable range, the image of each of the markers 8a and 8b is taken by the imaging information calculation section 35. Namely, the taken image obtained by the imaging information calculation section 35 includes the image of each of the markers 8a and 8b (target images). FIG. 11 shows an example of a taken image including the target images. In FIG. 11, area A1 indicated by the dashed line represents an area in the taken image. The image processing circuit 41 uses image data of the taken image including the target images to detect coordinate sets representing positions of the markers 8a and 8b in the taken image.

Specifically, the image processing circuit 41 detects a coordinate set representing a position of an area in the taken image matching a predetermined condition on an area-by-area basis. The predetermined condition is a condition for detecting a target image. Specifically, the predetermined condition is that the area needs to have a brightness having a predetermined value or higher (high brightness area) and needs to have a size within a predetermined range. The predetermined condition only needs to be a condition for detecting a target image, and in other embodiments, may include a condition regarding the color of the image. The target images appear as high brightness areas in the image data of a taken image. Therefore, the image processing circuit 41 first detects the high brightness areas as candidates of the target images. Next, based on the size of each detected high brightness area, the image processing circuit 41 determines whether or not the high brightness area is a target image. The taken image may include images other than the target images (images 8a' and 8b' of the markers 8a and 8b) due to sunlight coming through a window or light of a fluorescent lamp in the room. The above-described determination is performed in order to distinguish the target images 8a' and 8b' from the other images so that the target images are accurately detected. Specifically, it is determined whether or not each detected high brightness area has a size within a predetermined size range. When the high brightness area has a size within the predetermined size range, the high brightness area is determined to be a target image; whereas when the high brightness area has a size outside the predetermined size range, the high brightness area is determined not to be a target image.

The image processing circuit 41 calculates the position of a high brightness area which is determined to be a target image as a result of the determination. Specifically, the image processing circuit 41 calculates the position of the center of gravity of the high brightness area. The position of the center of gravity can be calculated at a more detailed scale than the resolution of the imaging element 40. In this embodiment, the resolution of the taken image obtained by the imaging element 40 is 126×96, and the position of the center of gravity is calculated at a scale of 1024×768. Namely, the coordinate set of the position of the center of gravity is represented by integer values from (0,0) to (1024, 768). As shown in FIG. 11, a position in the taken image is represented by a coordinate system (x-y coordinate system) in which the upper left corner of the taken image is the origin, the downward direction from the origin is a positive y-axis direction, and the rightward direction from the origin is a positive x-axis direction. The image processing circuit 41 outputs data representing the coordinate set calculated by the above-described calculation processing. As described above, the data on the coordinate set is transmitted to the game apparatus 3 by the microcomputer 42 as the operation data. In this embodiment, the processing up to the calculation of a coordinate set representing the position of the target image based on the taken image is executed by the image processing circuit 41 and/or the microcomputer 42 of the controller 7. For example, the taken image may be transmitted to the game apparatus 3 so that processing equivalent to the subsequent processing is executed by the CPU 10 of the game apparatus 3 or the like.

In this manner, the image processing circuit 41 detects a coordinate set representing the position of an area in the taken image which matches a predetermined condition on an area-by-area basis. In the following description, a coordinate set detected by the image processing circuit 41 will sometimes be referred to as a "marker coordinate set".

Hereinafter, an overview of processing of calculating an inclination of the controller 7 will be described. In this embodiment, an inclination of the controller 7 regarding the rotation around the Z' axis will be calculated.

In this embodiment, the game apparatus 3 first calculates two types of inclinations of the controller 7 using two different methods. According to a first method, an inclination of the controller 7 is calculated from information obtained by the imaging information calculation section 35 (taken image). According to a second method, an inclination of the controller 7 is calculated from information obtained by the acceleration sensor 37 (acceleration data). The game apparatus 3 uses the two types of inclinations obtained by two methods to calculate a final inclination of the controller 7 which is to be used for a game operation.

In this embodiment, a direction of the inclination of the controller 7 is represented as a vector. In the following description, a vector representing the inclination obtained by the first method will be referred to as a "first vector", and a vector representing the inclination obtained by the second method will be referred to as a "second vector". The game apparatus 3 calculates a final inclination of the controller 7 using the first vector and the second vector. In the following description, the vector which is used for a game operation as a vector representing an inclination of the controller 7 will be referred to as an "output vector". In this embodiment, processing of calculating the first vector and the second vector, and processing of calculating the output vector using the first vector and the second vector, are executed frame by frame.

Figure 12:
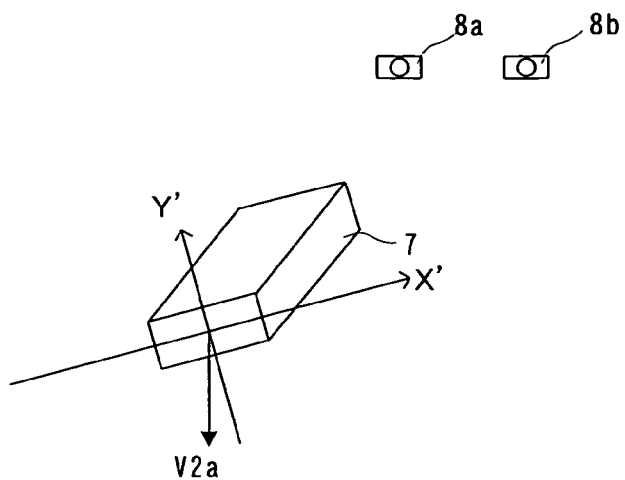
FIG. 12 shows the controller 7 in an inclined state as a result of being rotated around the Z' axis.
Figure 13:
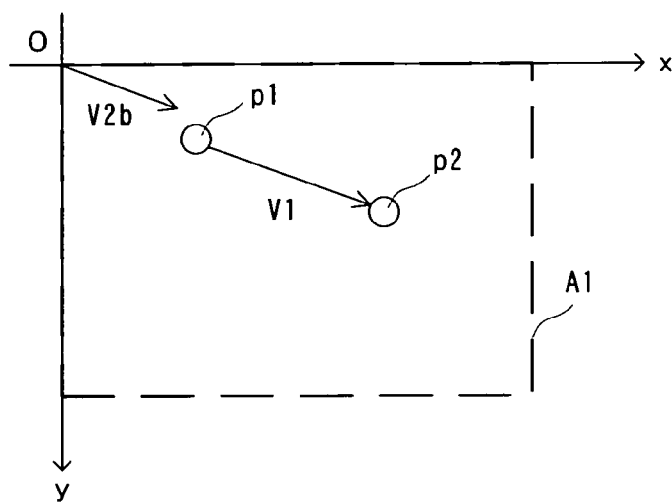
FIG. 13 shows a first vector and a second vector obtained in a state shown in FIG. 12.

With reference to FIG. 11 through FIG. 13, processing of calculating a first vector by the first method will be described. In the taken image shown in FIG. 11, point p1 and point 2 each represent the position of a marker image on the x-y plane. In the following description, a coordinate set representing the position of a marker image will be referred to as a "marker coordinate set". In this embodiment, data representing a marker coordinate set is transmitted from the controller 7 to the game apparatus 3. When the images of the markers 8a and 8b are properly taken, data on two marker coordinate sets (in the example of FIG. 11, a coordinate set representing point p1 and a coordinate set representing point p2) is transmitted.

Upon obtaining the two marker coordinate sets, the game apparatus 3 calculates a vector V1 connecting the two marker coordinate sets. The calculated vector V1 is the first vector. The first vector V1 has one of the two marker coordinate sets as a start point and the other marker coordinate set as an end point. The first vector V1 represents an inclination of the controller 7 regarding the rotation around the Z' axis (see FIG. 7). For example, in the case where the direction connecting the markers 8a and 8b is parallel to the X' axis of the controller 7, the first vector V1 is parallel to the x axis as shown in FIG. 11. FIG. 12 shows the controller 7 in an inclined state as a result of being rotated around the Z' axis. As shown in FIG. 12, in the case where the X' axis of the controller 7 is inclined at a predetermined angle with respect to the direction connecting the markers 8a and 8b, the game apparatus 3 obtains coordinate set data on points p1 and p2 as shown in FIG. 13 from the controller 7. FIG. 13 shows a first vector and a second vector obtained in the state shown in FIG. 12. As shown in FIG. 13, the first vector V1 represents a direction inclined at the predetermined angle with respect to the x axis. Since the direction of the first vector V1 varies in accordance with the inclination of the controller 7 regarding the rotation around the Z' axis, the inclination of the controller 7 regarding the rotation around the Z' axis can be found based on the first vector V1.

Next, with reference to FIG. 12 and FIG. 13, processing of calculating a second vector by the second method will be described. In the case where the controller 7 is in the state of FIG. 12, a vector representing an acceleration detected by the acceleration sensor 37 is a vector V2a shown in FIG. 12. In this embodiment, acceleration data representing the vector V2a is transmitted from the controller 7 to the game apparatus 3. The vector V2a is a three-dimensional vector represented in the X'-Y'-Z' coordinate system.

Upon obtaining the vector V2a from the controller 7, the game apparatus 3 converts the vector V2a into a vector of the x-y coordinate system. The game apparatus 3 also calculates a second vector V2b using the post-conversion vector. In this embodiment, the second vector V2b is calculated using a second vector calculated previously (previous second vector) and the vector of the x-y coordinate system converted from the vector V2a obtained currently by the acceleration sensor 37. In this specification, the term "previous" means "immediately previous". The processing of calculating the second vector V2b will be described in detail later (see FIG. 17 and FIG. 18). When, for example, the vector V2a shown in FIG. 12 is detected by the acceleration sensor 37, the second vector obtained by the conversion is the vector V2b shown in FIG. 13. When the detection by the imaging information calculation section 35 and the detection by the acceleration sensor 37 are accurate, the first vector V1 and the second vector V2b are directed in the same direction as shown in FIG. 13.

The first method and the second method have the following characteristics. The first method is advantageous in being able to calculating an inclination more accurately than the second method, but is disadvantageous in occasionally not being able to calculate the first vector. The first vector cannot be calculated when, for example, the position and the posture of the controller 7 are not in the detectable range; sunlight, light from a fluorescent lamp in the room or other light displayed on the monitor 2 is incorrectly recognized as the light from the markers 8a and 8b; or the controller 7 is too far from the markers 8a and 8b to detect the light from the markers 8a and 8b. In these cases, the marker coordinate sets are not detected, only one marker coordinate set is detected, or three or more marker coordinate sets are detected. Therefore, the game apparatus 3 cannot calculate the first vector The second method is advantageous in being able to constantly calculate the second vector V2b because the acceleration sensor 37 always outputs acceleration data, but is disadvantageous in being lower in terms of precision of the detected inclination than the first method. For example, when the controller 7 is being moved by the player, the acceleration detected by the acceleration sensor 37 includes other acceleration components caused by an inertial force in addition to the acceleration of gravity. When such an acceleration is detected, the inclination cannot be accurately calculated.

In this embodiment, the game apparatus 3 calculates an output vector using the first vector V1 and the second vector V2b in consideration of the advantages and the disadvantages of the first method and the second method. Specifically, when the first vector V1 is calculated, the output vector is calculated based on the first vector V1. When the first vector V1 is not calculated, the output vector is calculated based on the second vector V2b. With this method, when the first vector is calculated, the inclination of the controller 7 is accurately calculated, whereas when the first vector is not calculated, the inclination of the controller 7 is calculated using the second vector V2b so as to avoid the situation where the inclination is not calculated.

Figure 14:
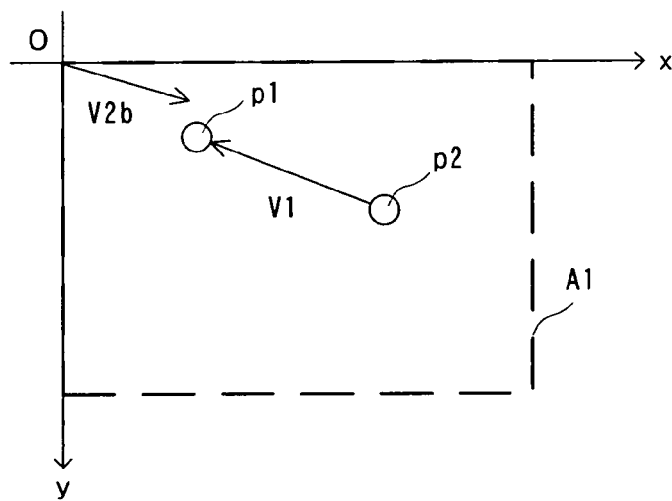
FIG. 14 shows a first vector V1 and a second vector V2b in one state.

Also in the first embodiment, when the first vector V1 is calculated, the game apparatus 3 compares the first vector V1 and the second vector V2b and corrects the first vector V1 in accordance with the comparison result, instead of simply setting the first vector V1 as the output vector. Specifically, when the directions of the first vector V1 and the second vector V2b are opposite to each other, the first vector V1 is corrected to be directed in the opposite direction. FIG. 14 shows the first vector V1 and the second vector V2b in one state. In the state shown in FIG. 14, the directions of the first vector V1 and the second vector V2b are different from each other by 180°. In this case, the game apparatus 3 corrects the vector V1 so as to be directed in the opposite direction and sets the post-correction vector as the output vector.

The first vector V1 is corrected based on the comparison result for the following reason. With the first method, the first vector V1 may possibly be directed in the opposite direction to a vector corresponding to the direction of the actual inclination of the controller 7. With the first method, a vector connecting the two marker coordinate sets is set as the first vector V1. When each of the two marker coordinate sets is incorrectly recognized as the start point or the end point, the direction of the first vector V1 is different from the accurate direction by 180°. By contrast, the second vector V2b calculated by the second method may not possibly correspond to the actual inclination of the controller 7 strictly accurately, but usually is not directed in the opposite direction. Therefore, in this embodiment, when the direction of the second vector V2b and the direction of the first vector V1 are significantly different (by an angle close to 180°; for example, 90° to 270°), the direction of the first vector V1 is regarded as being opposite to the actual direction. The first vector V1 is corrected so as to be directed oppositely. Thus, the first vector V1 can be calculated more accurately, and as a result, the inclination of the controller 7 can be more accurately calculated.

Figure 15:
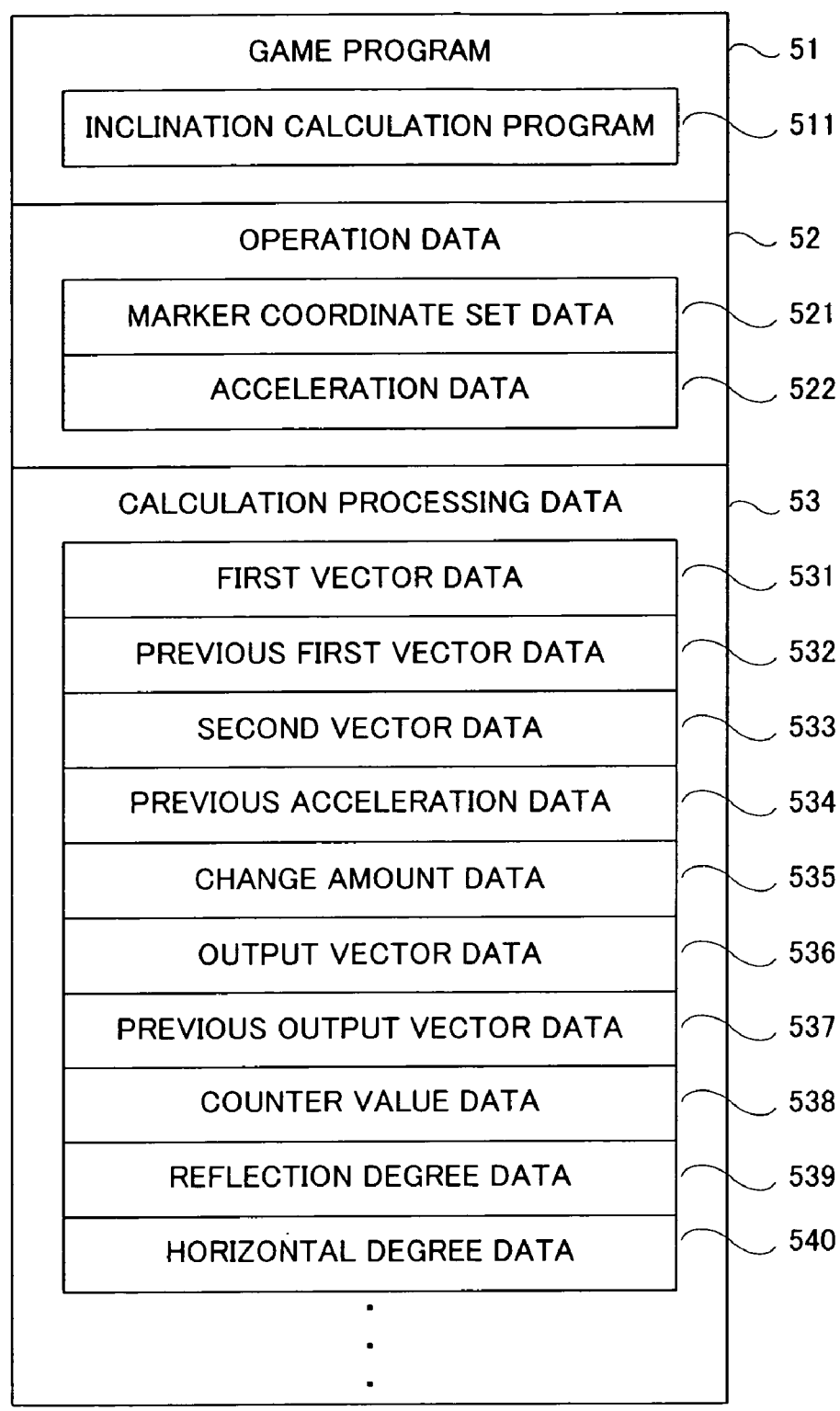
FIG. 15 shows main data stored on a main memory 13 of the game apparatus 3.

Next, the game processing executed by the game apparatus 3 will be described in detail. First, main data used for the game processing will be described with reference to FIG. 15. FIG. 15 shows main data stored on the main memory 13 of the game apparatus 3. As shown in FIG. 15, the main memory 13 has stored thereon a game program 51, operation data 52, calculation processing data 53 and the like. In addition to the above-mentioned data, the main memory 13 has stored thereon image data of characters appearing in the game, data representing various parameters of the characters, and other data necessary for the game processing.

The game program 51 is partially or entirely read from the optical disc 4 at an appropriate time after the game apparatus 3 is powered on and stored on the main memory 13. The game program 51 includes an inclination calculation program 511. The inclination calculation program 511 is a program for executing the processing of calculating an inclination of the controller 7 (the inclination calculation processing) using an output from the imaging information calculation section 35 and an output from the acceleration sensor 37. The game program 51 includes programs necessary for the game processing in addition to the inclination calculation program 511.

The operation data 52 is transmitted from the controller 7 to the game apparatus 3 and stored on the main memory 13. The operation data 52 includes marker coordinate set data 521 and acceleration data 522. The marker coordinate set data 521 represents a coordinate set detected by the image processing circuit 41, i.e., a marker coordinate set mentioned above. As described above, there is no limitation on the number of marker coordinate sets detected. Therefore, the marker coordinate set data 521 may represent a plurality of marker coordinate sets, may represent only one marker coordinate set, or may represent there is no marker coordinate set.

The acceleration data 522 represents an acceleration vector detected by the acceleration sensor 37. Herein, the acceleration data 522 represents an acceleration in three axial directions (X'-, Y'-, and Z'-axis directions) shown in FIG. 7. In addition to the marker coordinate set data 521 and the acceleration data 522, the operation data 52 includes data representing operations performed on the buttons and switches of the operation section 32.

The calculation processing data 53 is used for processing of calculating an output vector (steps S3 through S5 described later). The calculation processing data 53 includes first vector data 531, previous first vector data 532, second vector data 533, previous acceleration data 534, change amount data 535, output vector data 536, previous output vector data 537, counter value data 538, reflection degree data 539, and horizontal degree data 540.

The first vector data 531 represents a first vector described above. The first vector is basically calculated frame by frame, but may not be calculated as a result of the game apparatus 3 failing to calculate the first vector depending on the content of the marker coordinate set. The first vector data 531 is updated each time a new first vector is calculated so as to constantly represent the latest first vector. The previous vector data 532 is used in a second embodiment described later, and represents a first vector calculated previously. When a new first vector is calculated and the first vector data 531 is updated, the pre-update first vector is stored on the main memory 13 as the updated previous first vector data 532.

The second vector data 533 represents a second vector described above. The second vector V2b is calculated frame by frame. The second vector 533 is updated each time a new second vector is calculated so as to constantly represent the latest second vector.

The previous acceleration data 534 represents an acceleration data calculated previously. When new operation data is transmitted from the controller 7 to the game apparatus 3 and the acceleration data 522 is updated, acceleration data calculated previously is stored on the main memory 13 as the updated previous acceleration data 534 to be used in the next frame for calculating a vector.

The change amount data 535 represents a change amount from the acceleration detected by the acceleration sensor 37 previously to the acceleration detected by the acceleration sensor 37 currently. Specifically, in this embodiment, the change amount data 535 represents a change amount of the direction of the acceleration. This change amount indicates a degree of reliability of an output from the acceleration sensor 37, i.e., a degree of accuracy of the inclination represented by the output from the acceleration sensor 37 to the actual inclination of the controller 7.

The output vector data 536 represents an output vector described above. The output vector is calculated frame by frame. The output vector data 536 is updated each time a new output vector is calculated so as to constantly represent the latest output vector.

The counter value data 538 is used in the second embodiment, and represents a counter value which indicates the number of frames from the calculation state of the first vector was changed. The expression that "the calculation state of the first vector is changed" means that the first vector was calculated previously but is not calculated currently, or the first vector was not calculated previously but is calculated currently.

The reflection degree data 539 is used in the second embodiment, and represents a degree at which the vector calculated previously is to be reflected on the vector calculated currently (reflection degree). The reflection degree is calculated based on the counter value.

The horizontal degree data is used in a third embodiment described later, and represents a degree at which the controller 7 is in a horizontally direction (horizontal degree). Herein, the state in which the controller 7 is in a horizontal direction is a state in which the negative Y'-axis direction of the controller 7 (FIG. 7) matches the direction of the acceleration of gravity.

The previous vector data 532, the counter value data 538, the reflection degree data 539 and the horizontal degree data 540 are used in the second or third embodiment, and do not need to be stored on the main memory 13 in the first embodiment.

Figure 16:
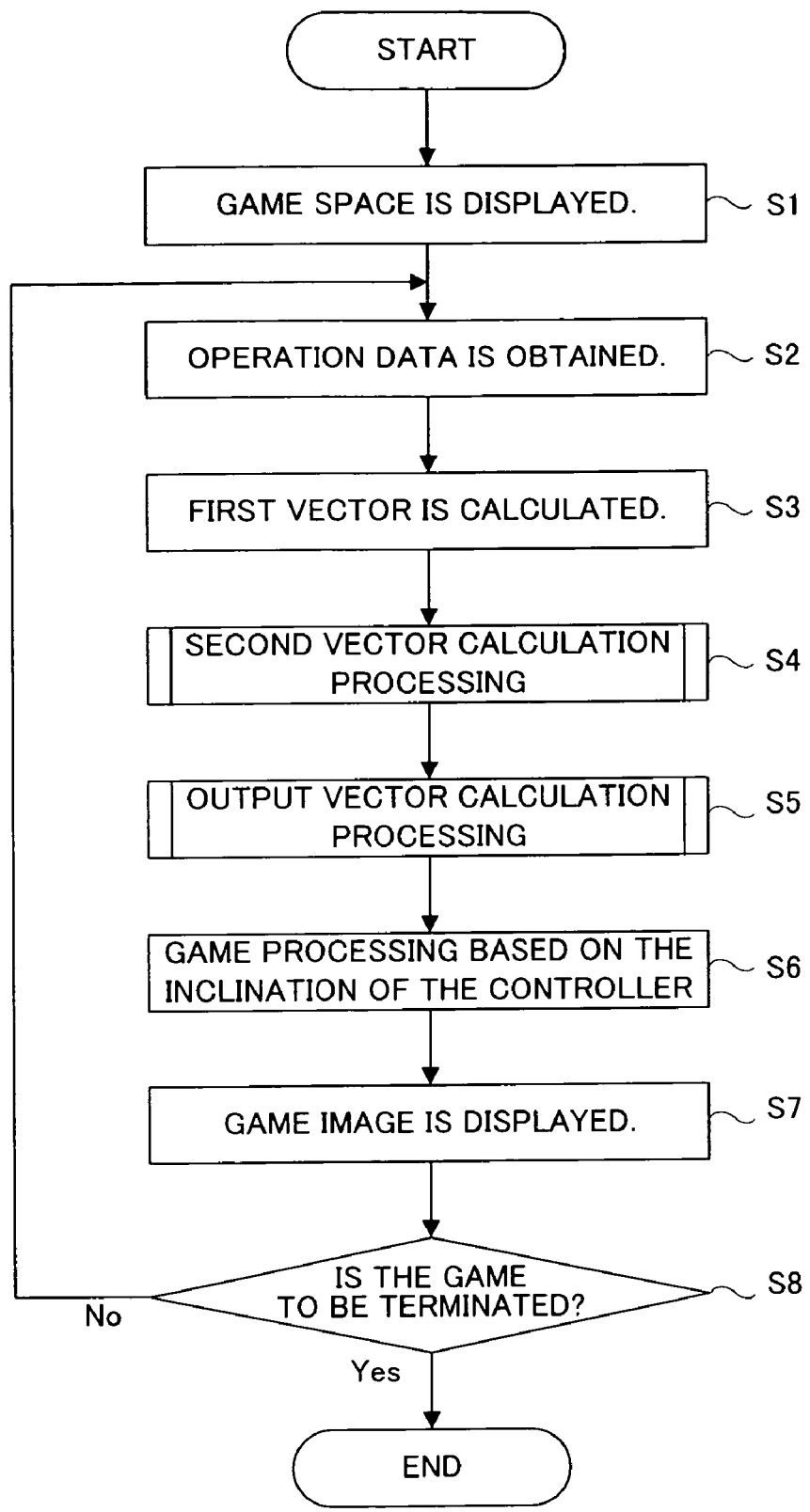
FIG. 16 is a flowchart illustrating a flow of game processing executed by the game apparatus 3.

Next, the game processing executed by the game apparatus 3 will be described in detail with reference to FIG. 16 through FIG. 19. FIG. 16 is a flowchart illustrating a flow of the game processing executed by the game apparatus 3. When the game apparatus 3 is turned on, the CPU 10 of the game apparatus 3 executes a start program stored on the boot ROM (not shown) to initialize each unit such as the main memory 13. The game program stored on the optical disc 4 is read into the main memory 13, and the CPU 10 starts the execution of the game program. The flowchart shown in FIG. 16 illustrates the game processing after the above-described processing is completed. With reference to FIG. 16, the game processing for calculating an inclination of the controller 7 from a taken image obtained from the imaging information calculation section 35 and an acceleration detected by the acceleration sensor 37 will be explained in detail, and other game processing not directly relevant to the present invention will be omitted.

First in step S1, a game space is constructed and displayed on the monitor 2. The CPU 10 constructs, for example, a three-dimensional game space (or a two-dimensional game space) and locates objects appearing in the game space at predetermined initial positions. A game image representing the game space thus constructed is generated and displayed on the monitor 2. After this, the processing loop of steps S2 through S8 is repeated frame by frame, and thus the game proceeds.

In step S2, the CPU 10 obtains operation data from the controller 7. More specifically, the controller 7 transmits the operation data to the game apparatus 3 at a predetermined time interval (for example, frame by frame), and the CPU 10 stores the transmitted operation data on the main memory 13. In the case where the operation data includes marker coordinate set data, the CPU 10 stores the marker coordinate set data on the main memory 13. In the case where the operation data includes acceleration data, the CPU 10 stores the acceleration data on the main memory 13.

After step S2, the CPU 10 executes the inclination calculation program 511 to execute steps S3 through S5. First in step S3, a first vector is calculated based on the marker coordinate set data 521 stored on the main memory 13. When two marker coordinate sets are detected (when the marker coordinate set data 521 represents two marker coordinate sets), the CPU 10 calculates a vector, having one of the marker coordinate sets as a start point and the other marker coordinate set as an end point, as a first vector. Which of the two marker coordinate sets is to be the start point of the vector and which is to be the end point of the vector may be determined in accordance with a predetermined condition. The predetermined condition is, for example, that the marker coordinate set having a smaller x coordinate value is set as the start point. Alternatively, the marker coordinate set closer to the start point of the previous output vector may be set as the start point. Data representing the calculated first vector is stored on the main memory 13 as the updated first vector 531. The pre-update first vector is stored on the main memory 13 as the updated previous vector data 532.

In this embodiment, when the number of the detected marker coordinate sets is not two (i.e., when zero marker coordinate set, one marker coordinate set, or three or more marker coordinate sets are detected), the CPU 10 determines that it is impossible to calculate a first vector. In this case, the first vector data 531 is updated to indicate that the first vector could not be calculated. Like in the case where two marker coordinate sets are detected, the pre-update first vector data is stored on the main memory 13 as the updated previous vector data 532.

In this embodiment, the first vector is calculated from two marker coordinate sets. The first vector may be calculated by another method. As the method for calculating the first vector, any method using at least a marker coordinate set is usable. For example, the first vector may be calculated using the marker coordinate set data and also acceleration data which is an output from the acceleration sensor 37. More specifically, according to one usable method, when only one marker coordinate set is detected, another marker coordinate set is estimated using the acceleration data. The two marker coordinate sets thus obtained are used to calculate the first vector. When three or more marker coordinate sets are detected, two marker coordinate sets which fulfill a predetermined condition regarding a distance between the marker coordinate sets or the like are selected from the three or more marker coordinate sets. The two marker coordinate sets thus obtained may be used to calculate the first vector.

Figure 17:
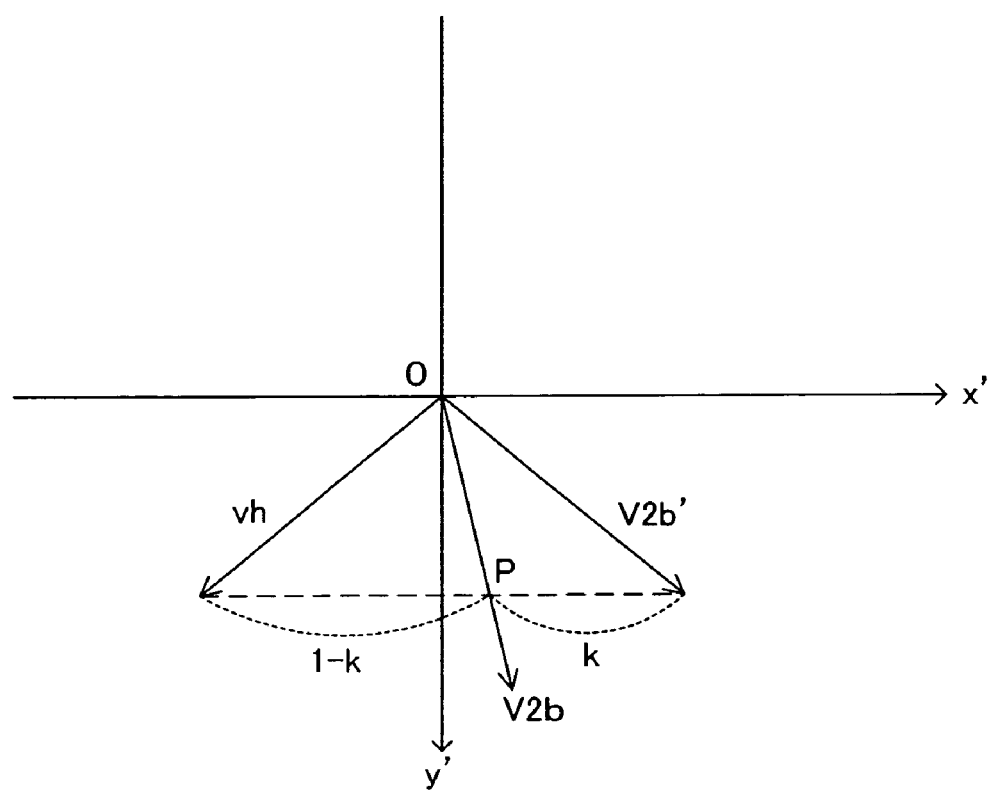
FIG. 17 illustrates second vector calculation processing.
Figure 18:
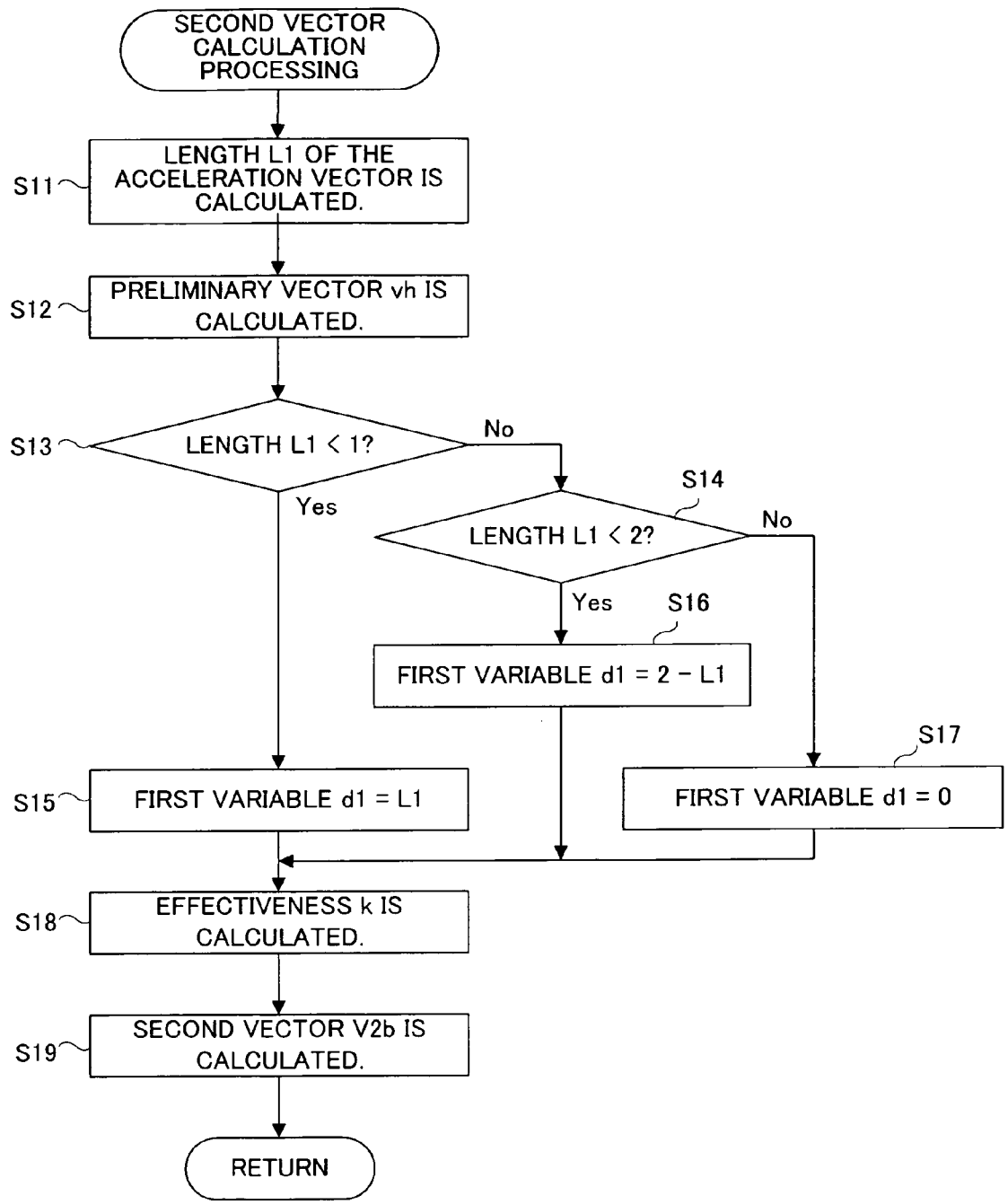
FIG. 18 is a flowchart illustrating a detailed flow of the second vector calculation processing in step S4 shown in FIG. 16.

Next in step S4, second vector calculation processing is executed. By the second vector calculation processing, a second vector is calculated based on the acceleration data 522 included in the operation data 52 stored on the main memory 13 in step S2. With reference to FIG. 17 and FIG. 18, the second vector calculation processing will be described.

First, with reference to FIG. 17, an overview of the second vector calculation processing will be described. FIG. 17 illustrates the second vector calculation processing. The second vector calculation processing is executed as follows. The game apparatus 3 first calculates a preliminary vector vh from an acceleration vector V2a detected by the acceleration sensor 37. The preliminary vector vh indicates an inclination of the controller 7 represented by the acceleration vector itself. Specifically, the preliminary vector vh is obtained by extracting an X'-axis component and a Y'-axis component of the acceleration vector V2a and performing predetermined coordinate set conversion on the extracted two-dimensional vector so as to provide a vector of the x-y coordinate system (see FIG. 11). The preliminary vector vh is represented in the x-y coordinate system, and has the origin of the x-y coordinate system as a start point. The preliminary vector vh is a unit vector having a length of 1. The preliminary vector vh is uniquely determined from the acceleration vector. The preliminary vector vh represents an inclination of the controller 7 under an assumption that the acceleration vector represents the acceleration of gravity (an assumption that the acceleration vector is directed in the direction of the acceleration of gravity).

The reason why only the X'-axis component and the Y'-axis component of the acceleration vector V2a are extracted is as follows. In the first embodiment, it is intended to calculate an inclination of the controller 7 regarding the rotation around the Z' axis (in the X'-Y' directions), and therefore a Z'-axis component is not necessary. The reason why predetermined coordinate set conversion is performed on the extracted two-dimensional vector is that a vector corresponding to the acceleration vector is to be displayed as a vector having the same direction as the first vector in an ideal state, in the same coordinate system as the first vector. By using the same coordinate system to process the first vector and the second vector in this manner, processing of calculating an output vector using the first vector and the second vector is facilitated.

After calculating the preliminary vector vh, the game apparatus 3 calculates a second vector V2b (see FIG. 17) based on the preliminary vector vh and the previous second vector V2b'. Like the preliminary vector vh, the second vector V2b and the previous second vector V2b' are both a unit vector having a length of 1, and have the origin of the x-y coordinate system as a start point. As shown in FIG. 17, the second vector V2b is obtained by making the direction of the previous second vector V2b' closer to the direction of the preliminary vector vh at a predetermined degree. In the following description, the predetermined degree will be represented as an effectiveness k($0 \leq k \leq 1$). Specifically, the second vector V2b is directed from the origin toward point P and has a length of 1. Point P divides a line segment connecting the end point of the previous second vector V2b' and the end point of the preliminary vector vh at a ratio of k:(1−k). The effectiveness k is calculated based on the length of the preliminary vector vh. A method for calculating the effectiveness k will be described in detail later.

Hereinafter, with reference to FIG. 18, the second vector calculation processing will be described in detail. FIG. 18 is a flowchart illustrating a detailed flow of the second vector calculation processing in step S4 shown in FIG. 16. The second vector calculation processing is executed as follows. First in step S11, a length L1 regarding X' and Y' components of the acceleration data V2a detected by the acceleration sensor 37 is calculated. When the acceleration vector V2a is (ax, ay, az), the length L1 is calculated in accordance with the following expression.

$$L1 = (ax^2 + ay^2)^{1/2}$$

Next in step S12, the preliminary vector vh (see FIG. 17) is calculated. The preliminary vector vh can be calculated from the acceleration vector V2a. The CPU 10 refers to the acceleration data 522 stored on the main memory 13 to calculate components (hx, hy) of the preliminary vector vh in accordance with the following expressions.

$$hx = -ay/L1$$

$$hy = -ax/L1$$

In the above expressions, ax is a value of the X' component of the acceleration vector V2a, and ay is a value of the Y' component of the acceleration vector V2a. The reason why −ay is used for calculating hx and −ax is used for calculating hy in the above expressions is that coordinate set conversion from the coordinate system of the acceleration vector (X'-Y'-Z' coordinate system) into the coordinate system of the first vector (x-y coordinate system) is to be performed. The reason why −ay and −ax are each divided by the length L1 is that the length of the preliminary vector vh is to be 1.

By a series of processing in steps S13 through S17, a first variable d1 is calculated based on the length L1. In the series of processing, the first variable d1 is calculated such that the value of the first variable d1 is greater within the range of $0 \leq d1 < 1$ as the length L1 is closer to 1. First in step S13, it is determined whether or not the length L1 is less than 1. When it is determined in step S13 that the length L1 is equal to or greater than 1, processing in step S14 is executed. When it is determined in step S13 that the length L1 is less than 1, processing in step S15 is executed.

In step S14, it is determined whether or not the length L1 is less than 2. When it is determined in step S14 that the length L1 is less than 2, processing in step S16 is executed. When it is determined in step S14 that the length L1 is equal to or greater than 2, processing in step S17 is executed.

In step S15, the value of the length L1 is set as the value of the first variable d1. In step S16, the first variable d1 is calculated in accordance with the following expression.

$$d1 = 2 - L1$$

In step S17, the value of the length L1 is set to "0". As shown in steps S15 through S17, the first variable d1 represents a closeness of the length L1 to 1. The first variable is represented within the range of $0 \leq d1 \leq 1$. Therefore, when the length L1 is equal to or greater than 2, the value of the first variable d1 is set to 0. After step S15, S16 or S17, processing in step S18 is executed.

In step S18, an effectiveness k is calculated based on the first variable d1. As described above, the effectiveness k is a variable representing a degree at which the direction of the previous second vector V2b' is made closer to the direction of the preliminary vector vh for calculating a second vector V2b. Specifically, the CPU 10 calculates the effectiveness k in accordance with the following expression.

$$k = d1^2 \times A$$

In the above expression, A (>0) is a constant predetermined in the inclination calculation program 511. Data representing constant A is stored on the main memory 13 in advance. As can be appreciated from the above expression, the effectiveness k is greater in the range of $0 \leq k \leq 1$ as the value of the first variable d1 is greater.

Next in step S19, a second vector V2b is calculated. In this embodiment, the second vector V2b is calculated using the preliminary vector vh, the previous second vector V2b', and the effectiveness k. Specifically, the CPU 10 first calculates a vector (ahx', ahy') in accordance with the following expressions.

$$ahx' = (hx - bhx) \times k + bhx$$

$$ahy' = (hy - bhy) \times k + bhy$$

In the above expressions, the preliminary vector vh is (hx, hy) and the previous second vector V2b' is (bhx, bhy). The vector (ahx', ahy') calculated by the above expressions is directed in the same direction as the second vector V2b. Next, the CPU 10 corrects the above-calculated vector into a unit vector in accordance with the following expressions, thus to calculate the second vector V2b (=(ahx, ahy)).

$$ahx = ahx' / ((ahx'^2 + ahy'^2)^{1/2})$$

$$ahy = ahy' / ((ahx'^2 + ahy'^2)^{1/2})$$

The second vector V2b is calculated by the above expressions. The CPU 10 stores data representing the calculated second vector on the main memory 13 as the updated second data 533. After step S19, the CPU 10 terminates the second vector calculation processing.

In this embodiment, the second vector is calculated using the acceleration vector detected by the acceleration sensor 37 and the previous second vector. In other embodiments, the second vector may be calculated by any method using the acceleration vector. For example, the second vector may be calculated using only the acceleration vector. Specifically, a vector obtained by performing the above-described coordinate set conversion on the acceleration vector, i.e., the preliminary vector, may be used as the second vector.

Returning to FIG. 16, in step S5, output vector calculation processing is executed. The output vector calculation processing is executed for calculating an output vector using the first vector and the second vector. Hereinafter, with reference to FIG. 19, the output vector calculation processing will be described in detail.

Figure 19:
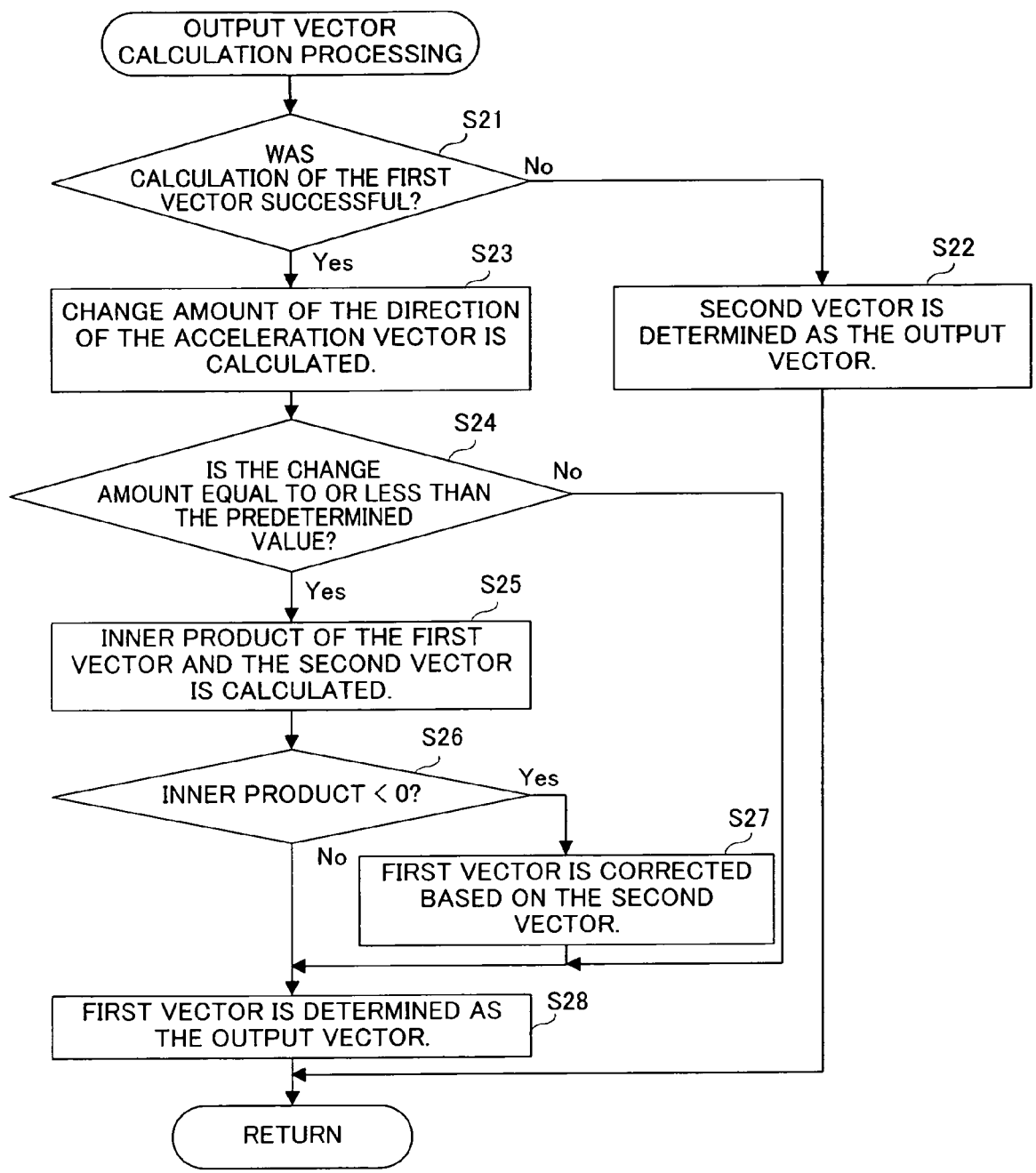
FIG. 19 is a flowchart illustrating a detailed flow of output vector calculation processing in step S5 shown in FIG. 16 in a first embodiment.

FIG. 19 is a flowchart illustrating a detailed flow of the output vector calculation processing in step S5 shown in FIG. 16. The output vector calculation processing is executed as follows. First in step S21, the CPU 10 determines whether or not calculation of the first vector was successful in step S3. The determination in step S21 can be performed by referring to the first vector data 531 stored on the main memory 13. When the first vector data 531 represents a vector value, it is determined that the calculation of the first vector was successful. When the first vector data 531 represents that it was impossible to calculate the first vector, it is determined that the calculation of the first vector was not successful. When it is determined in step S21 that the calculation of the first vector was successful, processing in steps S23 through S28 is executed. By the processing in steps S23 through S28, an output vector is calculated based on the first vector. When it is determined in step S21 that the calculation of the first vector was not successful, processing in step S22 is executed. In step S22, an output vector is calculated using the second vector without using the first vector.

In step S22, the second vector is determined as the output vector. Namely, the CPU 10 updates the content of the output vector data 536 stored on the main memory 13 into the same content as the second vector data 533 and stores the updated content as the output vector data 536. In this embodiment, when the calculation of the first vector was not successful, the second method is selected so that an output vector is calculated using the second vector without using the first vector. After step S22, the CPU 10 terminates the output vector calculation processing.

In this embodiment, the second vector is used as the output vector. In step S22, any method capable of calculating an output vector using the second vector without using the first vector may be used. For example, as in the second embodiment described later, an output vector may be calculated using the second vector and the previous output vector.

In step S23, the CPU 10 calculates a change amount of the direction of the acceleration vector. Specifically, the CPU 10 refers to the acceleration data 522 and the previous acceleration data 534 stored on the main memory 13 to calculate a change amount from the direction of the acceleration detected previously to the direction of the acceleration detected currently. The change amount can be calculated as a magnitude of an angle made by the previous acceleration vector and the current acceleration vector. Data representing the calculated change amount is stored on the main memory 13 as the change amount data 535.

Next in step S24, the CPU 10 determines whether or not the change amount calculated in step S23 is equal to or less than a predetermined value. The predetermined value is determined in advance in the inclination calculation program 511. The determination in step S24 is executed in order to determine whether or not the acceleration detected by the acceleration sensor 37 accurately corresponds to the actual inclination of the controller 7. When it is determined in step S24 that the change amount is equal to or less than the predetermined value, processing in steps S25 through S27 is executed. When it is determined in step S24 that the change amount is greater than the predetermined value, the processing in steps S25 through S27 is skipped and processing in step S28 is executed.

As described above, in this embodiment, when it is determined that the detected acceleration accurately corresponds to the actual inclination of the controller 7 (when the acceleration vector is reliable), the processing in steps S25 through S27 described below is executed. Thus, the first vector is corrected in accordance with the comparison result of the first vector and the second vector. If the processing in steps S25 through S27 is executed when the acceleration vector does not accurately correspond to the actual inclination of the controller 7, the correction performed in steps S25 through S27 is not accurate because the second vector calculated from the acceleration vector is not accurate. In this embodiment, it is determined by steps S23 and S24 whether or not the acceleration vector is reliable, and the processing in steps S25 through S27 is executed only when the acceleration vector is reliable. By such processing, the first vector is not corrected using the second vector when the acceleration vector is inaccurate. As a result, the first vector can be accurately calculated, and thus the output vector can be accurately calculated.

In steps S25 through S27, the first vector and the second vector are compared with each other. In accordance with the comparison result, the first vector is corrected. Specifically, the first vector is corrected in accordance with whether or not the directions of the first vector and the second vector are opposite to each other. First in step S25, an inner product of the first vector and the second vector is calculated. Next in step S26, it is determined whether or not the inner product calculated in step S25 is a negative value. The determination in step S26 is executed in order to determine whether or not the angle made by the first vector and the second vector is in the range of 90° to 270° and thus to determine whether or not the directions of the first vector and the second vector are opposite to each other. In this embodiment, when the angle made by the first vector and the second vector is in the range of 90° to 270°, it is determined that the directions of the first vector and the second vector are opposite to each other. In other embodiments, it may be determined that the directions of the first vector and the second vector are opposite to each other when the angle made by the first vector and the second vector is in the range of, for example, 135° to 225°.

When it is determined in step S26 that the inner product is a negative value, processing in step S27 is executed. In step S27, the first vector is corrected so as to be directed oppositely. The CPU 10 stores data representing the post-correction first vector on the main memory 13 as the first vector data 531. After step S27, processing in step S28 is executed. When it is determined in step S26 that the inner product is equal to or greater than 0, the processing in step S27 is skipped and the processing in step S28 is executed.

Instep S28, the first vector is determined as the output vector. Namely, the CPU 10 updates the content of the output vector data 536 stored on the main memory 13 into the same content as the first vector data 531 and stores the updated content as the output vector data 536. In this embodiment, when the first vector was successfully calculated, the first second vector is selected so that an output vector is calculated using the first vector. After step S28, the CPU 10 terminates the output vector calculation processing. By the output vector calculation processing, an inclination of the controller 7 is calculated.

Returning to FIG. 16, in step S6, game processing in accordance with the inclination of the controller 7 calculated in step S5 is executed. Specifically, the output vector data 536 stored on the main memory 13 is transferred (output) to the program for executing the game processing, and the game processing is executed in accordance with the program. The game processing is, for example, processing of moving a player character appearing in the game space in accordance with the inclination.

Next in step S7, a game image reflecting the result of the game processing executed in step S6 is generated and displayed on the monitor 2. Next in step S8, the CPU 10 determines whether or not to terminate the game. The determination in step S8 is made in accordance with, for example, whether or not the player has cleared the game, or when a time limit is provided for the game, whether or not the time has passed. When the result of determination in step S8 is negative, the processing returns to step S2 and the processing loop in steps S2 through S8 is repeated until it is determined that the game is to be terminated. When the result of determination in step S8 is positive, the CPU 10 terminates the game processing shown in FIG. 16. So far, the game processing has been described.

In the game processing shown in FIG. 16, after the second vector is calculated (step S4), it is determined whether or not the first vector was successfully calculated (step S21). In other embodiments, it is first determined whether or not the first vector was successfully calculated, and only when the first vector was not successfully calculated, the second vector may be calculated. Specifically, this may be performed as follows. After step S3 shown in FIG. 16, the processing in step S5 is executed. In step S22 in step S5, the second vector is calculated in the same manner as in step S4. With this method, the processing of calculating the second vector can be omitted when the second vector is not used for calculating the output vector. Therefore, the processing can be simplified, and the load on the game apparatus 3 can be alleviated.

As described above, in this embodiment, a final inclination of the controller 7 is calculated using two types of inclinations obtained by a method using the acceleration sensor 37 (the first method mentioned above) and by a method using the imaging means (the second method mentioned above). Thus, the advantages of the first and the second methods are utilized while the disadvantages thereof are compensated for. Therefore, the inclination of the controller 7 can be calculated accurately and constantly.

In the above embodiment, the change amount of the direction of the acceleration vector is calculated in step S23 in order to determine whether or not the acceleration vector is reliable. In other embodiments, the magnitude of the acceleration vector may be used instead of the change of the direction of the acceleration vector. In this case, in step S24, the CPU 10 determines whether or not a difference between the magnitude of the acceleration vector and the magnitude of the acceleration of gravity is equal to or less than a predetermined value. The acceleration vector is not reliable when, for example, the controller 7 is being violently moved or vibrated. In these cases, the magnitude of the acceleration vector is farther from 1, which is them magnitude of the acceleration of gravity. Thus, by executing the processing in steps S25 through S27 only when the difference between the magnitude of the acceleration vector and the magnitude of the acceleration of gravity is equal to or less than the predetermined value, substantially the same effect as in the above embodiment is provided. In other embodiments, in step S23, the change amount of the value of the acceleration vector may be used. In this case, the reliability of the acceleration vector is determined in accordance with whether or not the change amount of the value of the acceleration vector is equal to or less than a predetermined value. Thus, a change of the direction of the acceleration vector and a change of the magnitude of the acceleration vector can both be reflected on the determination on the reliability.

In the first embodiment, the processing in steps S23 through S27 is executed frame by frame. In other embodiments, the processing in steps S25 through S27 may be executed once every several frames. Alternatively, the processing in steps S25 through S27 may be executed frame by frame (or once every several frames) without executing the processing in steps S23 and S24. In still other embodiments, the processing in steps S25 through S27 may be executed only immediately after the change amount is greater than predetermined value. Specifically, only when the determination result in step S24 is negative in the previous frame and positive in the current frame, the processing in steps S25 through S27 may be executed.

Second Embodiment

Next, a game system including a game apparatus as an example of an inclination calculation apparatus according to the second embodiment of the present invention will be described. The hardware structure of the game system according to the second embodiment is substantially the same as the game system 1 according to the first embodiment. In the second embodiment, the contents of the output vector calculation processing are different from those of the first embodiment. Hereinafter, the second embodiment will be described mainly regarding the differences thereof from the first embodiment.

Figure 20:
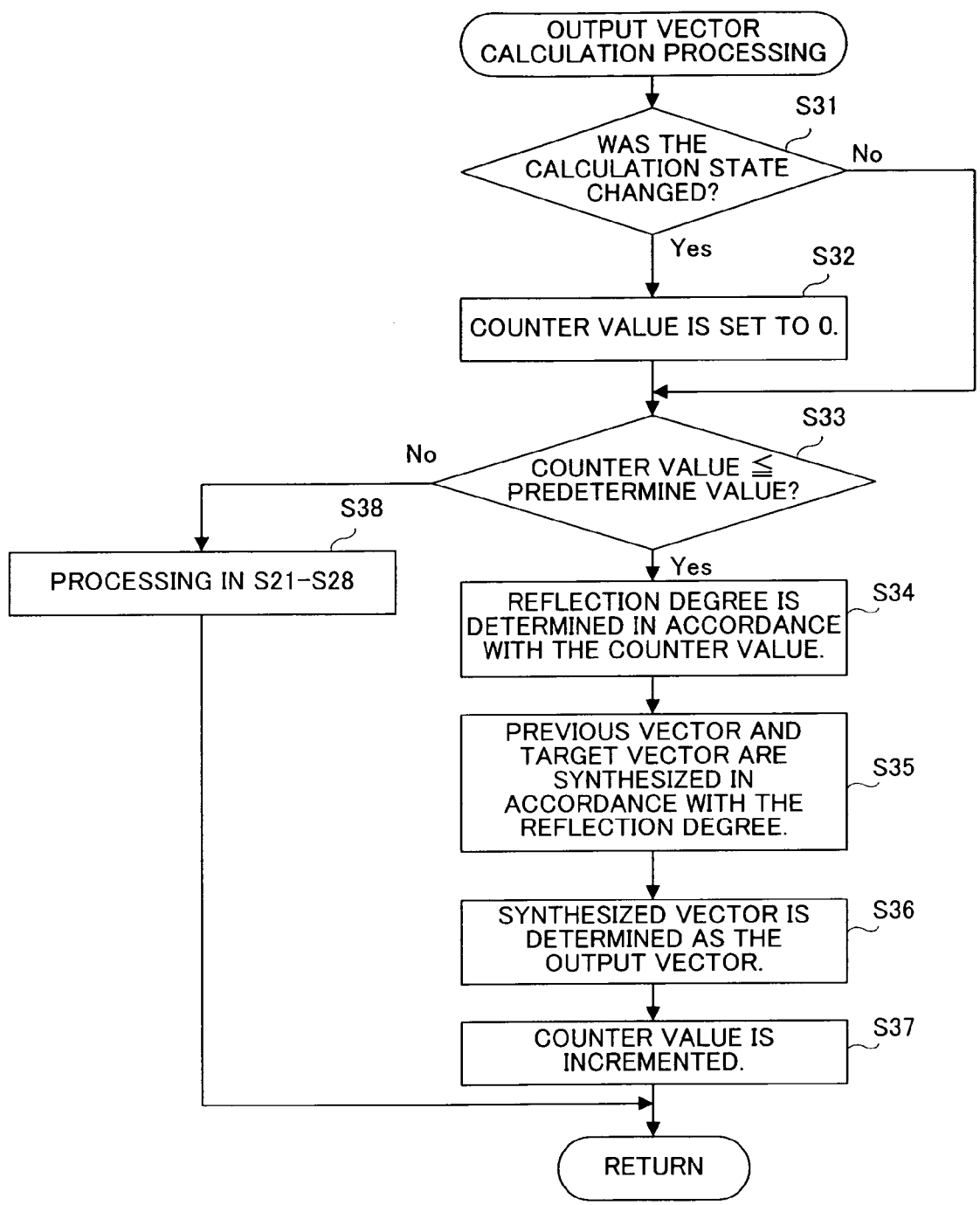
FIG. 20 is a flowchart illustrating a detailed flow of output vector calculation processing executed in a second embodiment.

FIG. 20 is a flowchart illustrating a detailed flow of the output vector calculation processing executed in the second embodiment. Except for the output vector calculation processing, the game processing in the second embodiment is substantially the same as that in the first embodiment.

The output vector calculation processing in the second embodiment is executed as follows. First in step S31, it is determined whether or not the calculation state of the first vector has been changed. As described above, the expression that "the calculation state of the first vector is changed" means that the first vector was calculated previously but is not calculated currently, or the first vector was not calculated previously but is calculated currently. The determination in step S31 is made by referring to the first vector data 531 and the previous first vector data 532 stored on the main memory 13. Specifically, when the first vector data 531 represents that the first vector was not successfully calculated and the previous vector data 532 represents a vector value, or when the first vector data 531 represents a vector value and the previous vector data 532 represents that the first vector was not successfully calculated, the CPU 10 determines that the calculation state of the first vector has been changed. When it is determined in step S31 that the calculation state of the first vector has been changed, processing in step S32 is executed. When it is determined in step S31 that the calculation state of the first vector has not been changed, the processing in step S32 is skipped and processing in step S33 is executed.

In step S32, the counter value is set to 0. Specifically, the CPU 10 updates the content of the counter value data 538 stored on the main memory 13 so as to represent "0" and stores the updated content as the counter value data 538. After step S32, the processing in step S33 is executed.

In step S33, it is determined whether or not the counter value is equal to or less than a predetermined value. The counter value which was set to 0 in step S32 is incremented by one in each frame until exceeding the predetermined value. Therefore, the counter value represents the time after the calculation state of the first vector was changed (time in units of frame). The processing in step S32 is executed in order to start counting the time after the calculation state of the first vector was changed. The processing in step S33 is executed in order to determined whether or not the time has exceeded the predetermined period. When it is determined in step S33 that the counter value is equal to or less than the predetermined value, processing in steps S34 through S37 is executed. When it is determined in step S33 that the counter value is greater than the predetermined value, processing in step S38 is executed.

In step S34, a reflection degree is determined in accordance with the magnitude of the counter value. The CPU 10 refers to the counter value data 538 stored on the main memory 13 to specify the magnitude of the counter value. The reflection degree is determined so as to be greater in the range of 0(%) to 100(%) as the magnitude of the counter value is greater. Data representing the determined reflection degree is stored on the main memory 13 as the reflection degree data 539.

Next in step S35, the CPU 10 synthesizes the previous output vector and a target vector in accordance with the reflection degree. The previous output vector is the output vector calculated in the previous frame, which is represented by the previous output vector data 537 stored on the main memory 13. The target vector is a vector as a target of synthesis. Specifically, when the first vector is calculated, the target vector is the first vector. When the first vector is not calculated, the target vector is the second vector. In other embodiments, when the first vector is the target vector, the first vector maybe corrected as in the first embodiment. Namely, the first vector obtained as a result of the processing in steps S23 through S27 may be set as the target vector.

The specific processing in step S35 is substantially the same as the processing in step S18, except that the preliminary vector in step S18 is replaced with the previous output vector, the previous second vector in step S18 is replaced with the target vector, and the effectiveness in step S18 is replaced with the reflection degree. A vector obtained by the synthesis is calculated such that the direction thereof is closer to the direction of the previous output vector as the reflection degree is greater and is closer to the target vector as the reflection degree is smaller. When the reflection degree is 100%, the vector obtained by the synthesis has the same direction as the previous output vector. When the reflection degree is 0%, the vector obtained by the synthesis has the same direction as the target vector.

Next in step S36, the vector obtained in step S35 is determined as the output vector. Specifically, the CPU 10 updates the content of the output vector data 536 stored on the main memory 13 into the content of data on the vector obtained in step S35, and stores the updated content as the output vector data 536.

Next in step S37, the counter value is incremented by 1. Specifically, the CPU 10 updates the content of the counter value data 538 stored on the main memory 13 so as to be increased by 1, and stores the updated content as the counter value data 538. After step S37, the CPU 10 terminates the output vector calculation processing shown in FIG. 20.

In step S38, substantially the same processing as that in steps S21 through S28 shown in FIG. 19 is executed. In the second embodiment, when the counter value is greater than the predetermined value, the output vector is calculated by the same method as in the first embodiment.

As described above, in the second embodiment, the game apparatus 3 starts counting the time when the calculation state of the first vector is changed (step S32). Until the time exceeds a predetermined period, a vector obtained by reflecting the previous output vector is set as the output vector (steps S34 through S36), instead of setting the target vector as the output vector. The output vector is calculated using the previous output vector in order to prevent the direction of the output vector from being drastically changed immediately after the calculation state of the first vector is changed. This will be described in more detail. The first vector and the second vector calculated in one frame do not necessarily have the same value. However, when the calculation state of the first vector is changed, the vector used as the output vector is changed from the first vector to the second vector, or from the second vector to the first vector. Therefore, when the calculation state of the first vector is changed, the direction of the output vector may be possibly changed drastically. In this case, the content of the game processing in accordance with the output vector is also drastically changed (for example, the moving velocity of an object in the game space may be rapidly changed). This may appear unnatural to the player and should be avoided. In the second embodiment, even when the calculation state of the first vector is changed, the output vector is calculated using the previous output vector and the target vector in order to prevent the direction of the output vector from changing drastically. As a result, the change from the previous output vector to the current output vector can be alleviated, and the game processing is prevented from appearing unnatural to the player.

In other embodiments, in step S38, the output vector calculation processing (FIG. 21) in the third embodiment described below may be executed.

Third Embodiment

Next, a game system including a game apparatus as an example of an inclination calculation apparatus according to the third embodiment of the present invention will be described. The hardware structure of the game system according to the third embodiment is substantially the same as the game system 1 according to the first embodiment. In the third embodiment, the contents of the output vector calculation processing are different from those of the first embodiment. Hereinafter, the third embodiment will be described mainly regarding the differences thereof from the first embodiment.

Figure 21:
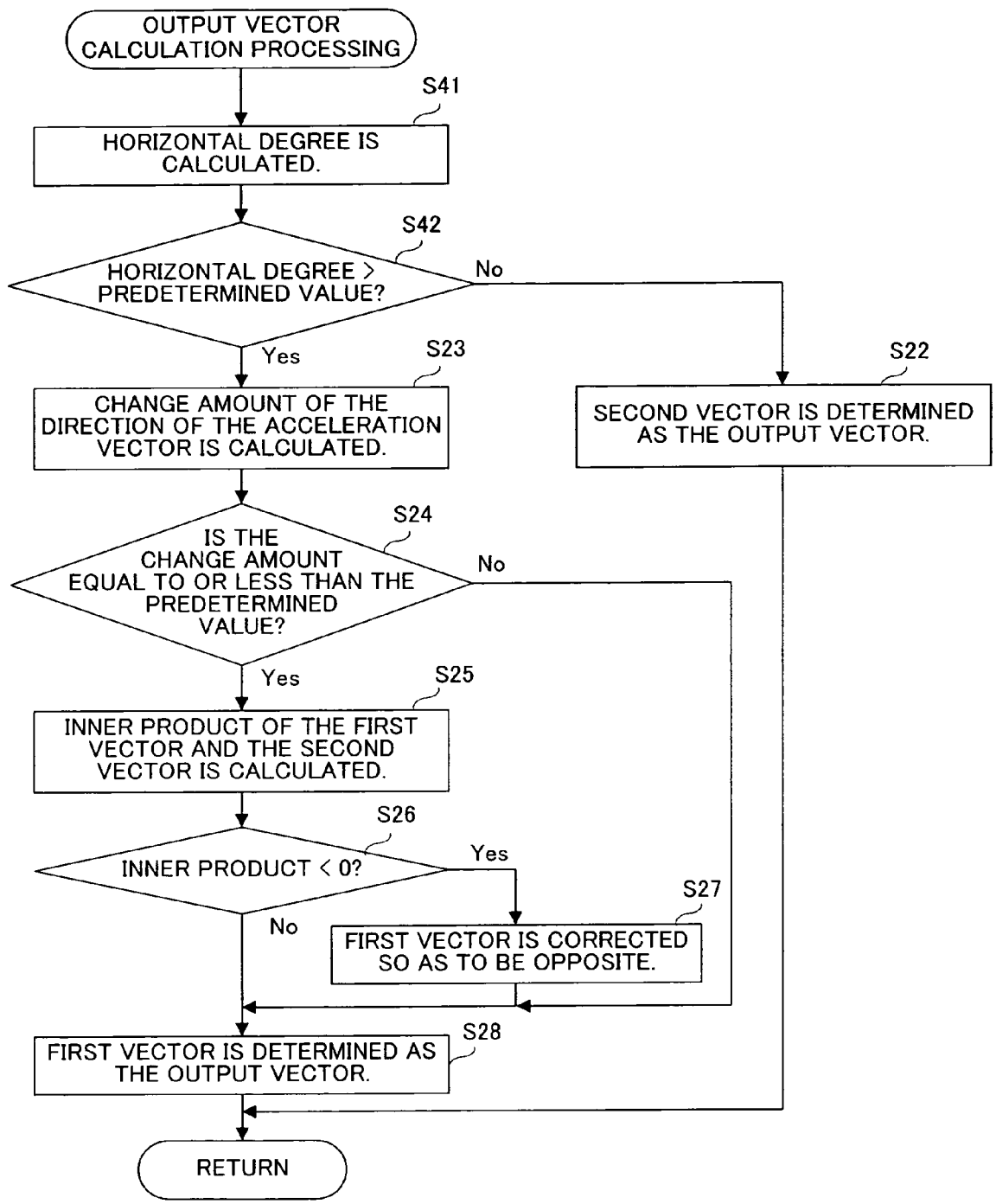
FIG. 21 is a flowchart illustrating a detailed flow of output vector calculation processing executed in a third embodiment.

FIG. 21 is a flowchart illustrating a detailed flow of the output vector calculation processing executed in the third embodiment. Except for the output vector calculation processing, the game processing in the third embodiment is substantially the same as that in the first embodiment. In FIG. 21, identical processing as that in FIG. 19 will bear the same step number and detailed description thereof will be omitted.

The output vector calculation processing in the third embodiment is executed as follows. First in step S41, a horizontal degree is calculated. Specifically, the horizontal degree is calculated based on a length L of the X' component and the Y' component of the acceleration vector detected by the acceleration sensor 37. When the acceleration vector V2a is (ax, ay, az), the length L is calculated in accordance with the following expression.

$$L=(ax^2+ay^2)^{1/2}$$

When the controller 7 is in a horizontal direction and still, the length L is the magnitude of the acceleration of gravity, i.e., "1". Therefore, the horizontal degree is calculated so as to be greater as the length L is closer to 1. For example, the horizontal degree S is calculated in accordance with the following expressions.

$$S=L \text{ (when } L \leq 1)$$

$$S=2-L \text{ (when } 1 \leq L \leq 2)$$

$$S=0 \text{ (when } L>2)$$

The CPU 10 stores data representing the calculated horizontal degree S on the main memory 13 as the horizontal degree data 540.

Next in step S42, it is determined whether or not the horizontal degree S calculated in step S41 is greater than a predetermined value. The processing in step S42 is executed in order to determine whether or not the controller 7 is in a direction close to the horizontal direction. The state in which the controller 7 is in a horizontal direction is a state in which the negative Y'-axis direction of the controller 7 (FIG. 7) matches the direction of the acceleration of gravity. When it is determined in step S42 that the horizontal degree S is greater than the predetermined value, the processing in steps S23 through S28 is executed as in the first embodiment. Namely, an output vector is calculated using the first vector. When it is determined in step S42 that the horizontal degree S is equal to or less than the predetermined value, the processing in step S22 is executed as in the first embodiment. Namely, an output vector is calculated using the second vector.

As described above, in the third embodiment, it is determined whether to calculate the output vector by the first method or by the second method in accordance with whether or not the controller 7 is in a horizontal direction (a direction close to the horizontal direction). In this embodiment, it is preconditioned that the controller 7 is operated, as shown in FIG. 9, in an area in front of the display screen of the monitor 2 or in the vicinity thereof. Accordingly, in the state where the controller 7 is in a substantially horizontal direction, the controller 7 is in the detectable range. However, in the state where the controller 7 is directed upward or downward, the controller 7 is assumed not to be in the detectable range. In this case, the images of the markers 8a and 8b are not taken. Therefore, the first vector cannot be calculated by the first method using the taken image. Even if the first vector is calculated, the calculated first vector is considered to be inaccurate. The reason is that when the controller 7 is directed upward, sunlight or light from a fluorescent lamp in the room, for example, is assumed to be incorrectly recognized as the light from the markers. Therefore, in the third embodiment, when the controller 7 is determined not to be in a horizontal direction ("No" in step S42), the output vector is calculated by the second method. Thus, an inaccurate output vector can be prevented from being calculated as a result of the imaging means incorrectly recognizing something else as the light from the markers.

In other embodiments, both the determination in step S21 in the first embodiment and the determination in step S42 in the third embodiment may be executed. In this case, the game apparatus 3 may calculate the first vector by the first method when the determination results of both of steps S21 and S42 are positive. The game apparatus 3 may calculate the first vector by the second method when the determination result of at least one of steps S21 and S42 is negative.

In the third embodiment, the horizontal degree is calculated based on the magnitude of the acceleration in two axial directions (X'-axis and Y'-axis directions) which are not parallel to the imaging direction of the imaging means. In other embodiments, the horizontal degree may be calculated based on the magnitude of the acceleration of one axial component (Z' component) which is parallel to the imaging direction of the imaging means. The length of the Z' component of the acceleration vector is smaller (closer to 0) as the controller 7 is in a direction closer to the horizontal direction. Therefore, the game apparatus 3 calculates the horizontal degree so as to be greater as the length of the Z' component of the acceleration vector is smaller. In the case where the horizontal degree is calculated using the X' component and the Y' component of the acceleration vector as in the third embodiment, the acceleration sensor 37 only needs to detect an acceleration in only two axial directions (X'-axis and Y'-axis directions). This is advantageous in simplifying the structure of the acceleration sensor 37. In the case where the horizontal degree is calculated using the Z' component, there is an advantage that the horizontal degree is calculated more easily.

The present exemplary embodiments are usable for, for example, a game apparatus or a game program for performing highly precise detection of an inclination of an input device to be used as an operation input while utilizing the advantages of detecting the inclination from an acceleration.

While the exemplary embodiments have been described in detail, the foregoing description is in all aspects illustrative and not restrictive. It is understood that numerous other modifications and variations can be devised without departing from the scope of the invention.

What is claimed is:

1. An inclination calculation apparatus for sequentially calculating an inclination of an input device operable in terms of a posture thereof, wherein the input device includes an acceleration detector for detecting an acceleration in at least two axial directions and an imaging element for taking an image of two imaging targets, the inclination calculation apparatus comprising:

an image information processor for sequentially calculating first inclination information representing an inclination of the input device from positions of the two imaging targets in a taken image obtained by the imaging element;

an acceleration information processor for sequentially calculating second inclination information representing an inclination of the input device from an acceleration detected by the acceleration detector; and an inclination calculator for calculating an inclination of the input device using the first inclination information and the second inclination information;

wherein the inclination calculator selects one of a calculation method using the first inclination information and a calculation method using the second inclination information, and calculates the inclination of the input device by the selected calculation method.

2. An inclination calculation apparatus according to claim 1, further comprising first determination programmed logic circuitry for determining whether or not calculation of the first inclination information by the image information processor was successful, wherein the inclination calculator calculates the inclination of the input device using at least the first inclination information when the first determination programmed logic circuitry determines that the calculation of the first inclination information was successful, and calculates the inclination of the input device using the second inclination information without using the first inclination information when the first determination programmed logic circuitry determines that the calculation of the first inclination information was unsuccessful.

3. An inclination calculation apparatus according to claim 1, further comprising second determination programmed logic circuitry for determining whether or not the inclination of the input device is within a range in which the imaging element is assumed to be capable of taking an image of the two imaging targets, wherein the inclination calculator calculates the inclination of the input device using at least the first inclination information when the second determination programmed logic circuitry determines that the inclination of the input device is within the range, and calculates the inclination of the input device using the second inclination information without using the first inclination information when the second determination programmed logic circuitry determines that the inclination of the input device is outside the range.

4. An inclination calculation apparatus according to claim 3, wherein:

the acceleration dectector is capable of detecting an acceleration in three axial directions including one axial direction along an imaging direction of the imaging element; and the second determination programmed logic circuitry determines whether or not the inclination of the input device is within the range in accordance with whether or not a magnitude of the acceleration in the one axial direction along the imaging direction is equal to or less than a predetermined threshold value.

5. An inclination calculation apparatus according to claim 3, wherein:

the acceleration detector is capable of detecting an acceleration in at least two axial directions which are not along an imaging direction of the imaging element; and the second determination programmed logic circuitry determines whether or not the inclination of the input device is within the range in accordance with whether or not a magnitude of the acceleration in the two axial directions which are not along the imaging direction is equal to or greater than a predetermined threshold value.

6. An inclination calculation apparatus for sequentially calculating an inclination of an input device operable in terms of a posture thereof, wherein the input device includes an acceleration detector for detecting an acceleration in at least two axial directions and an imaging element for taking an image of two imaging targets, the inclination calculation apparatus comprising:

an image information processor for sequentially calculating first inclination information representing an inclination of the input device from positions of the two imaging targets in a taken image obtained by the imaging element;

an acceleration information processor for sequentially calculating second inclination information representing an inclination of the input device from an acceleration detected by the acceleration detector; and an inclination calculator for calculating an inclination of the input device using the first inclination information and the second inclination information wherein the inclination calculator includes:

comparison programmed logic circuitry for comparing the first inclination information and the second inclination information; and correction programmed logic circuitry for setting, as the inclination of the input device, an inclination obtained by correcting the inclination represented by the first inclination information in accordance with the comparison result obtained by the comparison programmed logic circuitry.

7. An inclination calculation apparatus according to claim 6, wherein:

the comparison programmed logic circuitry compares a direction of the inclination represented by the first inclination information and a direction of the inclination represented by the second inclination information, and determines whether the two directions are closer to being identical to each other or closer to being opposite to each other; and the correction programmed logic circuitry performs a correction for making the direction of the inclination represented by the first inclination information opposite when the two directions are determined to be closer to being opposite to each other.

8. An inclination calculation apparatus according to claim 6, further comprising third determination programmed logic circuitry for determining whether or not a change amount of a direction of the acceleration detected by the acceleration dector is equal to or less than a predetermined value, wherein the correction programmed logic circuitry performs a correction only when the determination result of the third determination programmed logic circuitry is positive.

9. An inclination calculation apparatus according to claim 6, further comprising fourth determination programmed logic circuitry for determining whether or not a difference between a magnitude of the acceleration detected by the acceleration detector and a magnitude of an acceleration of gravity is equal to or less than a predetermined value, wherein the correction programmed logic circuitry performs a correction only when the determination result of the fourth determination programmed logic circuitry is positive.

10. An inclination calculation apparatus according to claim 6, further comprising fifth determination programmed logic circuitry for determining whether or not a change amount of a value of the acceleration detected by the acceleration detector is equal to or less than a predetermined value, wherein the correction programmed logic circuitry performs a correction only when the determination result of the fifth determination programmed logic circuitry is positive.

11. A game apparatus for sequentially calculating an inclination of an input device operable in terms of a posture thereof and using the calculated inclination as an operation input for a game, wherein the input device includes an acceleration detector for detecting an acceleration in at least two axial directions and imaging element for taking an image of two imaging targets, the game apparatus comprising:

an image information processor for sequentially calculating first inclination information representing an inclination of the input device from positions of the two imaging targets in a taken image obtained by the imaging element;

an acceleration information processor for sequentially calculating second inclination information representing an inclination of the input device from an acceleration detected by the acceleration detector; and an inclination calculator for calculating an inclination of the input device using the first inclination information and the second inclination information;

wherein the inclination calculator selects one of a calculation method using the first inclination information and a calculation method using the second inclination information, and calculates the inclination of the input device by the selected calculation method.

12. A game apparatus according to claim 11, further comprising first determination programmed logic circuitry for determining whether or not calculation of the first inclination information by the image information processor was successful, wherein the inclination calculator calculates the inclination of the input device using at least the first inclination information when the first determination programmed logic circuitry determines that the calculation of the first inclination information was successful, and calculates the inclination of the input device using the second inclination information without using the first inclination information when the first determination programmed logic circuitry determines that the calculation of the first inclination information was unsuccessful.

13. A game apparatus according to claim 11, further comprising second determination programmed logic circuitry for determining whether or not the inclination of the input device is within a range in which the imaging element is assumed to be capable of taking an image of the two imaging targets, wherein the inclination calculator calculates the inclination of the input device using at least the first inclination information when the second determination programmed logic circuitry determines that the inclination of the input device is within the range, and calculates the inclination of the input device using the second inclination information without using the first inclination information when the second determination programmed logic circuitry determines that the inclination of the input device is outside the range.

14. A game apparatus according to claim 13, wherein:

the acceleration detector is capable of detecting an acceleration in three axial directions including one axial direction along an imaging direction of the imaging element; and the second determination programmed logic circuitry determines whether or not the inclination of the input device is within the range in accordance with whether or not a magnitude of the acceleration in the one axial direction along the imaging direction is equal to or less than a predetermined threshold value.

15. A game apparatus according to claim 13, wherein:

the acceleration detector is capable of detecting an acceleration in at least two axial directions which are not along an imaging direction of the imaging element; and the second determination programmed logic circuitry determines whether or not the inclination of the input device is within the range in accordance with whether or not a magnitude of the acceleration in the two axial directions which are not along the imaging direction is equal to or greater than a predetermined threshold value.

16. A game apparatus for sequentially calculating an inclination of an input device operable in terms of a posture thereof and using the calculated inclination as an operation input for a game, wherein the input device includes an acceleration detector for detecting an acceleration in at least two axial directions and imaging element for taking an image of two imaging targets, the game apparatus comprising:

an image information processor for sequentially calculating first inclination information representing an inclination of the input device from positions of the two imaging targets in a taken image obtained by the imaging element;

an acceleration information processor for sequentially calculating second inclination information representing an inclination of the input device from an acceleration detected by the acceleration detector; and an inclination calculator for calculating an inclination of the input device using the first inclination information and the second inclination information;

wherein the inclination calculator includes:

comparison programmed logic circuitry for comparing the first inclination information and the second inclination information; and correction programmed logic circuitry for setting, as the inclination of the input device, an inclination obtained by correcting the inclination represented by the first inclination information in accordance with the comparison result obtained by the comparison programmed logic circuitry.

17. A game apparatus according to claim 16, wherein:

the comparison programmed logic circuitry compares a direction of the inclination represented by the first inclination information and a direction of the inclination represented by the second inclination information, and determines whether the two directions are closer to being identical to each other or closer to being opposite to each other; and the correction programmed logic circuitry performs a correction for making the direction of the inclination represented by the first inclination information opposite when the two directions are determined to be closer to being opposite to each other.

18. A game apparatus according to claim 16, further comprising third determination programmed logic circuitry for determining whether or not a change amount of a direction of the acceleration detected by the acceleration detector is equal to or less than a predetermined value, wherein the correction programmed logic circuitry performs a correction only when the determination result of the third determination programmed logic circuitry is positive.

19. A game apparatus according to claim 16, further comprising fourth determination programmed logic circuitry for determining whether or not a difference between a magnitude of the acceleration detected by the acceleration detector and a magnitude of an acceleration of gravity is equal to or less than a predetermined value, wherein the correction programmed logic circuitry performs a correction only when the determination result of the fourth determination programmed logic circuitry is positive.

20. A game apparatus according to claim 16, further comprising fifth determination programmed logic circuitry for determining whether or not a change amount of a value of the acceleration detected by the acceleration detector is equal to or less than a predetermined value, wherein the correction programmed logic circuitry performs a correction only when the determination result of the fifth determination programmed logic circuitry is positive.

\* \* \* \* \*